(12) United States Patent  (10) Patent No.: US 12,413,116 B2
Chen et al.  (45) Date of Patent: Sep. 9, 2025

(54) MOTOR ROTOR, MOTOR, AND VEHICLE

(71) Applicant: Huawei Digital Power Technologies Co., Ltd., Shenzhen (CN)

(72) Inventors: Jinhua Chen, Dongguan (CN); Chaoqiang Wu, Shenzhen (CN); Zhao Zhou, Dongguan (CN); Jianxin Huang, Shenzhen (CN); Shaohua Wang, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 411 days.

(21) Appl. No.: 17/990,113

(22) Filed: Nov. 18, 2022

(65) Prior Publication Data
US 2023/0077647 A1 Mar. 16, 2023

Related U.S. Application Data

(63) Continuation of application No. PCT/CN2021/072624, filed on Jan. 19, 2021.

(30) Foreign Application Priority Data

May 18, 2020 (CN) .......................... 202010418983.6

(51) Int. Cl.
*H02K 9/14* (2006.01)
*H02K 1/12* (2006.01)
*H02K 1/26* (2006.01)

(52) U.S. Cl.
CPC ................. *H02K 9/14* (2013.01); *H02K 1/12* (2013.01); *H02K 1/26* (2013.01)

(58) Field of Classification Search
CPC .............. H02K 1/12; H02K 1/24; H02K 1/26; H02K 1/32; H02K 1/325; H02K 11/0094;
(Continued)

(56) References Cited

U.S. PATENT DOCUMENTS 5,189,325 A 2/1993 Jarczynski
2003/0030333 A1* 2/2003 Johnsen ................... H02K 1/32
310/54
(Continued)

FOREIGN PATENT DOCUMENTS

CN 1057551 A 1/1992
CN 105680596 A 6/2016
(Continued)

*Primary Examiner* — Naishadh N Desai
(74) *Attorney, Agent, or Firm* — Conley Rose, P.C.

(57) ABSTRACT

A motor rotor includes a wound rotor comprising a rotating shaft, a rotor core, and a plurality of rotor coils. The rotor core is fixedly sleeved on the rotating shaft, a plurality of winding holes surrounding the rotating shaft are provided at intervals on the rotor core, each winding hole penetrates through two ends that are of the rotor core and that are disposed in an axial direction, each rotor coil is wound on hole walls of two adjacent winding holes, and two adjacent rotor coils share one winding hole. A gap is formed between two adjacent rotor coils, a first shaft hole is formed on the rotating shaft, the gap is configured as a first heat dissipation channel connected to the first shaft hole, and the first heat dissipation channel is used for inflow of coolant in the rotating shaft.

20 Claims, 14 Drawing Sheets

(58) Field of Classification Search
CPC ............ H02K 19/12; H02K 3/24; H02K 9/14;
H02K 9/19
See application file for complete search history.

(56) References Cited

U.S. PATENT DOCUMENTS

| | | | |
|---|---|---|---|
| 2016/0043613 A1* | 2/2016 | Patel | H02K 9/22 |
| | | | 310/52 |
| 2016/0149451 A1* | 5/2016 | Teter | H02K 3/24 |
| | | | 310/54 |
| 2016/0164374 A1 | 6/2016 | Yang et al. | |
| 2018/0375403 A1 | 12/2018 | Garmon et al. | |
| 2020/0036248 A1 | 1/2020 | Krais et al. | |
| 2020/0112217 A1 | 4/2020 | Pal | |
| 2023/0077647 A1* | 3/2023 | Chen | H02K 1/12 |
| | | | 180/65.6 |
| 2024/0079934 A1* | 3/2024 | Ledieu | H02K 1/32 |

FOREIGN PATENT DOCUMENTS

| | | | |
|---|---|---|---|
| CN | 110535261 A | 12/2019 | |
| CN | 209982270 U | 1/2020 | |
| CN | 111162633 A | 5/2020 | |
| CN | 111769673 A | 10/2020 | |
| CN | 111769674 A | 10/2020 | |
| DE | 102016215428 A1 | 2/2018 | |
| EP | 3934066 A1 | 1/2022 | |

* cited by examiner

MOTOR ROTOR, MOTOR, AND VEHICLE

CROSS-REFERENCE TO RELATED APPLICATIONS

This is a continuation of International Patent Application No. PCT/CN2021/072624 filed on Jan. 19, 2021, which claims priority to Chinese Patent Application No. 202010418983.6 filed on May 18, 2020. The disclosures of the aforementioned applications are hereby incorporated by reference in their entireties.

TECHNICAL FIELD

This disclosure relates to the field of drive device technologies, and in particular, to a motor rotor, a motor, and a vehicle.

BACKGROUND

An excitation motor does not need to use magnetic steel, and excitation of a rotor of the excitation motor is adjustable. Therefore, the excitation motor has features such as low costs, no demagnetization risk, and high drive efficiency. The motor may be used as a drive device in the field of main drive and auxiliary drive systems of vehicles, prilling systems of factories, or the like.

In a related technology, an excitation motor includes a stator and a rotor, where the stator is movably sleeved on a periphery of the rotor, and the rotor is connected to a load. During operation, the rotor rotates relative to the stator under the action of a rotating magnetic field generated by the stator, thereby driving the load to move. To ensure that the rotor of the excitation motor can stably operate, effective heat dissipation needs to be performed on the rotor. In the conventional technology, a gap between an inner wall of a stator and an outer wall of a rotor is used as a cooling air duct, and a heat dissipation fan facing the cooling air duct is disposed at one end of the rotor. During heat dissipation, air blown by the heat dissipation fan enters the cooling air duct, and directly contacts a core of the rotor, to indirectly cool the stator and a winding on the core of the rotor through the core.

However, a conventional motor uses air cooling heat dissipation, and heat dissipation cannot be effectively performed on a core and a winding of a rotor of the motor. Consequently, a useful life of the motor is affected.

SUMMARY

Embodiments of this disclosure provide a motor rotor, a motor, and a vehicle, to resolve a problem that heat dissipation cannot be effectively performed on a conventional motor rotor because the conventional motor rotor uses air cooling heat dissipation.

An embodiment of this disclosure provides a motor rotor, including a wound rotor.

The wound rotor includes a rotating shaft, a rotor core, and a plurality of rotor coils, where the rotor core is fixedly sleeved on the rotating shaft, a plurality of winding holes surrounding the rotating shaft are provided at intervals on the rotor core, each winding hole penetrates through two ends that are of the rotor core and that are disposed in an axial direction, each rotor coil is wound on hole walls of two adjacent winding holes, and two adjacent rotor coils share one winding hole.

A gap is formed between two adjacent rotor coils, a first shaft hole is formed on the rotating shaft, and the gap is configured as a first heat dissipation channel connected to the first shaft hole.

In the motor rotor in this embodiment of this disclosure, the gap between two adjacent rotor coils is used as the first heat dissipation channel connected to the first shaft hole of the rotating shaft. In this way, coolant introduced into the rotating shaft from an outside enters the first heat dissipation channel from the first shaft hole under the action of centrifugal force, and directly dissipates heat from the rotor coil of the wound rotor. Compared with air cooling heat dissipation in the conventional technology, heat dissipation efficiency of the rotor coil is effectively improved. In addition, because the coolant is in direct contact with the rotor coil that generates a large amount of heat, a heat dissipation effect on the rotor coil is further improved, a useful life of the motor rotor is prolonged, and stable operation of the motor rotor is ensured. In addition, compared with a conventional motor, an additional heat dissipation fan does not need to be disposed in a heat dissipation structure of the motor rotor in this embodiment of this disclosure, and the winding hole in the rotor core is directly used as the first heat dissipation channel, so that a heat dissipation effect on the motor rotor is improved, a size of the motor rotor is reduced, and a structure of the motor rotor is simplified, thereby improving assembly efficiency of the motor rotor.

Optionally, a plurality of first shaft holes are provided at intervals on the rotating shaft in a circumferential direction, and a quantity of first shaft holes is equal to or less than a quantity of first heat dissipation channels.

The plurality of first shaft holes are provided on the rotating shaft, to improve efficiency of the coolant in the rotating shaft entering the first heat dissipation channels.

Optionally, the wound rotor further includes a first end plate and a second end plate that are respectively disposed at the two ends that are of the rotor core and that are in the axial direction.

A first radial channel configured to connect the first shaft hole and the first heat dissipation channel is formed between the rotor core and the first end plate, a first outlet channel connected to an outside of the rotor core is formed between the second end plate and the rotor core, and the first heat dissipation channel is connected to the first outlet channel. In this way, the coolant flowing out from the first shaft hole of the rotating shaft can flow in from one end that is of the first heat dissipation channel and that is in the axial direction through the first radial channel, and then flow out from the first heat dissipation channel through the first outlet channel at the other end of the first heat dissipation channel. In other words, the coolant flowing out from the rotating shaft flows in from one end of the rotor core and flows out from the other end of the rotor core. This lengthens a flow path of the coolant in the first heat dissipation channel, increases a contact area between the coolant and the rotor coil, and improves heat dissipation efficiency of the rotor coil and the rotor core. In addition, after exchanging heat with the rotor coil, the coolant can be timely discharged to the outside of the rotor core, to further ensure that heated coolant does not affect an operating temperature of the wound rotor. In addition, a manufacturing process of the first radial channel and the first outlet channel is simplified by disposing the first end plate and the second end plate. Therefore, it is ensured that the coolant flowing out from the first shaft hole can effectively enter one end of the first heat dissipation channel and smoothly flow out from the other end of the first heat dissipation channel to the outside of the rotor core, and manufacturing efficiency of the wound rotor in this embodiment of this disclosure is improved.

Optionally, the wound rotor further includes a first reinforcement assembly.

The first reinforcement assembly is disposed between the first end plate and the rotor core, and the first radial channel is disposed between the first reinforcement assembly and the first end plate.

The first reinforcement assembly is disposed between the first end plate and one end of the rotor core, to enhance structural strength of the wound rotor in a rotation process, and ensure structural stability in a high-speed operation process of the wound rotor formed through assembly of components such as the rotating shaft and the rotor core.

Optionally, the first reinforcement assembly includes a first potting adhesive.

A plurality of first radial holes surrounding the rotating shaft are provided at intervals on the first potting adhesive, the first radial hole separately extends to the first heat dissipation channel and the first end plate in the axial direction, and the first radial channel includes at least a part that is of the first radial hole and that extends in a radial direction.

The first potting adhesive is disposed to enhance connection strength between the rotor core and the first end plate, and improve the structural strength of the wound rotor. In addition, the first radial hole connected to the first heat dissipation channel is formed on the first potting adhesive, so that the coolant flowing out from the first shaft hole can also effectively enter the first heat dissipation channel.

Optionally, a quantity of first radial holes is equal to the quantity of first shaft holes, and each first radial hole penetrates to a corresponding first shaft hole in the radial direction. In this way, the coolant flowing out from each first shaft hole can enter each first heat dissipation channel through a corresponding first radial hole, thereby improving flow efficiency of the coolant from the first shaft hole of the rotating shaft to each first heat dissipation channel.

Optionally, the first reinforcement assembly further includes a first lantern ring fixedly sleeved on the rotating shaft, and the first potting adhesive is disposed on a periphery of the first lantern ring.

The first radial channel further includes a plurality of drainage grooves that surround the rotating shaft and that are disposed at intervals on the first lantern ring, the drainage grooves are disposed corresponding to the first shaft holes, a first end of each drainage groove extends to a corresponding first shaft hole, and a second end of the drainage groove is connected to the first radial hole.

The first lantern ring is disposed at one end of the rotor core, to limit the rotor core in the axial direction, and ensure stability of the rotor core on the rotating shaft in a high-speed rotation process. In addition, the drainage groove connected to the first shaft hole is disposed on the first lantern ring, so that the coolant flowing out from the first shaft hole enters the first radial hole of the first potting adhesive through each drainage groove, and is finally drained into the first heat dissipation channel through the first radial hole. This improves flow efficiency of the coolant from the rotating shaft to each first heat dissipation channel, and reduces a loss of the coolant on a path from the first shaft hole to the first heat dissipation channel.

Optionally, the quantity of first shaft holes is less than a quantity of first radial holes, and one drainage groove is connected between two adjacent first radial holes, to simplify a structure of the rotating shaft and the first lantern ring, thereby improving the manufacturing efficiency of the wound rotor.

Optionally, a gap is formed between the first lantern ring and a part that is of the first potting adhesive and that faces each drainage groove, and two ends of each gap respectively extend to the first radial holes on two adjacent sides of the drainage groove. In this way, the coolant drained out from each drainage groove can smoothly enter the first radial holes on the two sides through the gap. Therefore, structure disposition of the wound rotor is simplified, a loss amount of the coolant on the first radial channel is reduced, and it is ensured that the coolant is quickly drained from each first shaft hole to each first heat dissipation channel.

Optionally, the first reinforcement assembly further includes a first end framework sleeved on the first lantern ring, and the first end framework is located between the first potting adhesive and the rotor core.

A first avoidance port is formed at a position that is of the first end framework and that corresponds to the winding hole, and each rotor coil passes through the first avoidance port and is wound on one side that is of the first end framework and that is away from the rotor core.

The first end framework is disposed to further enhance structural strength of one end of the rotor core, and enhance stability of the rotor core in the axial direction of the rotating shaft. In addition, a part that is of each rotor coil and that passes through one end of the winding hole is wound on one end that is of the first end framework and that is away from the rotor core, so that when the first end framework is an electrical-insulating material, an insulation function is implemented between the rotor coil and an end part of the rotor core.

Optionally, a first limiting part extends, in a direction away from the rotor core, from one end that is of the first end framework and that is away from the rotating shaft, and a part that is of each rotor coil and that passes through the first end framework is located between the first limiting part and the rotating shaft, to limit movement of the rotor coil in a direction perpendicular to the rotating shaft, thereby improving stability of the rotor coil in the radial direction.

Optionally, the wound rotor further includes a second reinforcement assembly.

The second reinforcement assembly is disposed between the second end plate and the rotor core, and the first outlet channel is disposed between the second reinforcement assembly and the second end plate.

The second reinforcement assembly is disposed between the second end plate and the rotor core, to further enhance the structural strength of the wound rotor in the rotation process, and ensure the structural stability in the high-speed operation process of the wound rotor formed through assembly of components such as the rotating shaft and the rotor core.

Optionally, the second reinforcement assembly includes a second potting adhesive, a plurality of second radial holes surrounding the rotating shaft are provided at intervals on the second potting adhesive, two ends that are of the second radial hole and that are in the axial direction respectively extend to the first heat dissipation channel and the second end plate, and at least a part that is of the second radial hole and that extends in the radial direction is configured as the first outlet channel.

The second potting adhesive is disposed to enhance connection strength between the rotor core and the second end plate, and improve the structural strength of the wound rotor. In addition, the second radial hole connected to the first heat dissipation channel is formed on the second potting adhesive, so that the coolant flowing out from the first heat dissipation channel can be smoothly discharged to the outside of the rotor core through the second radial hole. In addition, the second radial hole configured to drain out the coolant is formed on the second potting adhesive, so that structure disposition of the first outlet channel is more convenient and simpler.

Optionally, a plurality of second heat dissipation channels surrounding the rotating shaft are disposed at intervals on the rotor core, the second heat dissipation channel is located between the rotating shaft and the first heat dissipation channel, the second heat dissipation channel penetrates through the two ends that are of the rotor core and that are disposed in the axial direction, a second shaft hole connected to the second heat dissipation channel is formed on the rotating shaft, and the second heat dissipation channel is used for inflow of the coolant in the rotating shaft.

In this embodiment of this disclosure, the plurality of second heat dissipation channels are disposed in the rotor core in the axial direction, and the second shaft hole connected to the second heat dissipation channel is provided on the rotating shaft. In this way, after the coolant flowing out from the second shaft hole enters the second heat dissipation channel, heat dissipation is directly performed on the rotor core, thereby further improving heat dissipation efficiency of the wound rotor and ensuring the stable operation of the motor rotor.

Optionally, the second reinforcement assembly further includes a second lantern ring fixedly sleeved on the rotating shaft, and the second lantern ring is disposed between the rotating shaft and the second potting adhesive.

A first annular groove is formed between the second lantern ring and the rotating shaft, and the second shaft hole and one end that is of the second heat dissipation channel and that faces the second lantern ring are located in the first annular groove.

The second lantern ring is disposed at the other end of the rotor core, to further limit the rotor core in the axial direction of the rotating shaft, and ensure the stability of the rotor core on the rotating shaft in the high-speed rotation process. In addition, two ends of the second heat dissipation channel respectively penetrate to the two ends of the rotor core, to lengthen a flow path of the coolant in the rotor core, thereby improving heat dissipation efficiency of the coolant on the rotor core. In addition, the first annular groove is disposed between the second lantern ring and the rotating shaft, and each second shaft hole and one end of each second heat dissipation channel are accommodated in the first annular groove. In this way, the coolant flowing out from the second shaft hole first enters the first annular groove, and the coolant smoothly enters the second heat dissipation channel in a buffer process of the first annular groove, thereby avoiding a loss of the coolant in a process of flowing into the second heat dissipation channel.

Optionally, a second outlet channel connected to the outside of the rotor core is formed between the first potting adhesive and the first end plate.

A perforative hole is formed on the first lantern ring in an extension direction of the rotating shaft, and two ends of the perforative hole are respectively connected to the second heat dissipation channel and the second outlet channel. In this way, the coolant flowing out from the second heat dissipation channel enters the second outlet channel through the perforative hole of the first lantern ring, and is finally drained out to the outside of the rotor core. In addition, the second outlet channel connected to the outside is formed between the first potting adhesive and the first end plate, to ensure that the coolant flowing out from the second heat dissipation channel can smoothly flow to the outside of the rotor core, so that disposition of the second outlet channel is more convenient and faster, thereby improving the manufacturing efficiency of the wound rotor.

Optionally, a quantity of perforative holes is less than a quantity of second heat dissipation channels. A second annular groove surrounding the rotating shaft is disposed on one side that is of the first lantern ring and that faces the second heat dissipation channel, and the perforative hole is located in the second annular groove.

Because the quantity of perforative holes is set to be less than the quantity of second heat dissipation channels, a manufacturing process of the first lantern ring is simplified. In addition, flow efficiency of the coolant from the second heat dissipation channel to the second outlet channel is reduced, so that the coolant flowing out from the perforative hole can gradually dissipate heat from the first end plate, that is, contact duration between the coolant and the first end plate is prolonged, and a heat dissipation effect of the coolant flowing out from the second heat dissipation channel on the first end plate is improved. In addition, the second annular groove is disposed on the side that is of the first lantern ring and that faces the second heat dissipation channel, to ensure that the coolant flowing out from each second heat dissipation channel can smoothly enter the perforative hole in a buffer process of the second annular groove, thereby reducing a loss of the coolant in a process of flowing into the perforative hole from the second heat dissipation channel.

Optionally, the second outlet channel and the first radial channel are disposed in a staggered manner. In this way, a flow path of the first heat dissipation channel and a flow path of the second heat dissipation channel are independent of each other, that is, after exchanging heat with the rotor core, the coolant can be directly discharged to the outside of the rotor core after entering the second outlet channel without entering the first heat dissipation channel through the first radial channel, thereby preventing heated coolant from affecting the heat dissipation effect on the rotor coil. In addition, at least a part of the coolant entering the first radial channel from the first shaft hole is prevented from flowing out from the second outlet channel to the outside of the rotor core before entering the first heat dissipation channel, and normal heat dissipation of the coolant to the wound rotor is prevented from being affected.

Optionally, the wound rotor further includes a second end framework sleeved on the second lantern ring, and the second end framework is located between the second potting adhesive and the rotor core.

A second avoidance port is formed at a position that is of the second end framework and that corresponds to the winding hole, and each rotor coil passes through the second avoidance port and is wound on one side that is of the second end framework and that is away from the rotor core.

The second end framework is disposed to further enhance structural strength of the other end of the rotor core, and enhance the stability of the rotor core in the axial direction of the rotating shaft. In addition, a part that is of each rotor coil and that passes through one end of the winding hole is wound on one end that is of the second end framework and that is away from the rotor core, so that when the second end framework is an electrical-insulating material, an insulation function is implemented between the rotor coil and an end part of the rotor core.

Optionally, the rotor core includes a core body and a plurality of groove wedges.

A plurality of winding grooves surrounding the rotating shaft are formed on an outer wall of the core body, each winding groove penetrates through two ends that are of the core body and that are disposed in the axial direction, each groove wedge is clamped at a groove opening that is of a corresponding winding groove and that is away from the rotating shaft, and a groove wall of the winding groove and the groove wedge jointly enclose to form the winding hole.

According to the disposition manner of the rotor core, the rotor coil can be directly wound on groove walls of two adjacent winding grooves by using groove openings of the core body, thereby improving assembly efficiency between the rotor coil and the core body. In addition, each groove wedge is clamped at the groove opening of the winding groove, to prevent the rotor coil from being released from the winding groove.

Optionally, a first radial channel is formed between the two ends that are of the rotor core and that are disposed in the axial direction, and two ends of the first radial channel respectively penetrate to the first shaft hole and the first heat dissipation channel in the radial direction of the rotor core.

Optionally, the wound rotor further includes a rotor jacket.

The rotor jacket includes a first annular jacket and a second annular jacket, where one of the first annular jacket and the second annular jacket is sleeved on a periphery that is of the first reinforcement assembly and that is away from the rotating shaft, and the other of the first annular jacket and the second annular jacket is sleeved on a periphery that is of the second reinforcement assembly and that is away from the rotating shaft.

In this embodiment of this disclosure, the rotor jacket is sleeved on the periphery of the first reinforcement assembly and the periphery of the second reinforcement assembly, to further enhance structural strength of the end parts of the wound rotor, thereby ensuring the structural stability of the motor rotor in the high-speed operation process.

Optionally, the motor rotor further includes an excitation module.

The excitation module includes an excitation transformer rotor fixedly sleeved on the rotating shaft and a rectifier board electrically connected to the excitation transformer rotor. The rectifier board is fastened to the first end plate, and a lead of the rotor coil is electrically connected to the rectifier board.

The excitation module further includes a third potting adhesive. The excitation transformer rotor is connected to the first end plate by using the third potting adhesive. In this way, connection strength between the excitation transformer rotor and the first end plate is enhanced, thereby improving connection strength between the excitation module and the wound rotor, and ensuring structural stability of the entire motor in a moving process. In addition, the rectifier board is fastened to the first end plate, so that the coolant in a heat dissipation groove of the first end plate can further dissipate heat from the rectifier board, thereby ensuring stable operation of the rectifier board.

Optionally, the rectifier board is disposed on one side that is of the first end plate and that is away from the rotor core, the excitation transformer rotor is disposed on one side that is of the rectifier board and that is away from the rotor core, and the rectifier board is located in the third potting adhesive. In this way, components of the excitation module are packaged into an integral structure by using the third potting adhesive. This enhances structural strength of the excitation module, and makes assembly between the excitation module and both of the rotating shaft and the wound rotor more convenient and faster. In addition, the rectifier board is disposed on the side that is of the first end plate and that is away from the rotor core, to provide a proper disposition space for disposing the heat dissipation groove, and facilitate electrical connection between the rectifier board and the excitation transformer rotor.

Optionally, the rotor coil is detachably connected to the rectifier board. In this way, a detachable connection between the wound rotor and the excitation module is implemented, so that the excitation module is detached and replaced as a separate module.

Optionally, the excitation module further includes an excitation module rotor jacket sleeved on the rotating shaft, the excitation transformer rotor is sleeved on the excitation module rotor jacket, and one end of the third potting adhesive is connected to the excitation module rotor jacket.

The excitation module rotor jacket is disposed to enhance connection strength between the excitation transformer rotor and the rotating shaft, and ensure stability of the excitation transformer rotor in the high-speed rotation process of the rotating shaft. In addition, one end of the third potting adhesive is connected to the excitation module rotor jacket, to further ensure that the components of the excitation module are packaged into an integral structure by using the third potting adhesive, so that connection strength between the components of the entire excitation module is enhanced, and the integrally modularized excitation module is quickly assembled on the rotating shaft and is fixedly connected to the wound rotor.

Optionally, a third heat dissipation channel connected to the first shaft hole is formed on the first end plate or the excitation module rotor jacket in the axial direction of the rotating shaft. In this way, the coolant flowing out from the first shaft hole can further enter the third heat dissipation channel, to effectively dissipate heat from the excitation module.

Optionally, a notch is formed on a sidewall of the first end plate or the second end plate, and the notch is disposed away from the rotating shaft.

The notch is disposed on a sidewall that is of the first end plate and that is away from the rotating shaft, to adjust a center of gravity of the wound rotor, and ensure that the center of gravity of the wound rotor is located on an axis of the rotating shaft, so that a dynamic balance of the wound rotor is implemented, and it is ensured that each component of the wound rotor can stably synchronously move around the axis of the rotating shaft.

Optionally, an annular boss is formed at one end that is of the first end plate and that is away from the rotating shaft, the notch is disposed on the annular boss, and the rectifier board is disposed between the rotating shaft and the annular boss.

The annular boss is disposed on the first end plate to meet a requirement for a notch of a different depth. In addition, the annular boss also plays a role of limiting and protecting the rectifier board disposed on the first end plate in the radial direction.

An embodiment of this disclosure further provides a motor, including a stator and the foregoing motor rotor, where the stator is movably sleeved on a periphery of the motor rotor.

In the motor in this embodiment of this disclosure, the motor rotor is disposed in the stator. Compared with air cooling heat dissipation in the conventional technology, heat dissipation efficiency of the motor rotor is effectively improved, a useful life of the motor is prolonged, and stable operation of the motor rotor is ensured. In addition, compared with a conventional motor, an additional heat dissipation fan does not need to be disposed in a heat dissipation structure of the motor in this embodiment of this disclosure, and the winding hole in the rotor core is directly used as the first heat dissipation channel, so that a heat dissipation effect on the motor is improved, a size of the motor is reduced, and a structure of the motor is simplified, thereby improving assembly efficiency of the motor.

An embodiment of this disclosure further provides a vehicle, including at least wheels, a transmission component, and the foregoing motor, where the rotating shaft of the motor is connected to the wheels by using the transmission component.

In the vehicle provided in this embodiment of this disclosure, the motor is used to drive the wheels to rotate. A heat dissipation effect of the motor is good, so that the motor can stably drive the wheels to rotate without affecting normal drive of the wheels due to overheating of the motor, thereby effectively improving drive efficiency of the vehicle, and reducing drive and heat dissipation energy consumption of the vehicle.

DESCRIPTION OF REFERENCE NUMERALS

Figure 1:
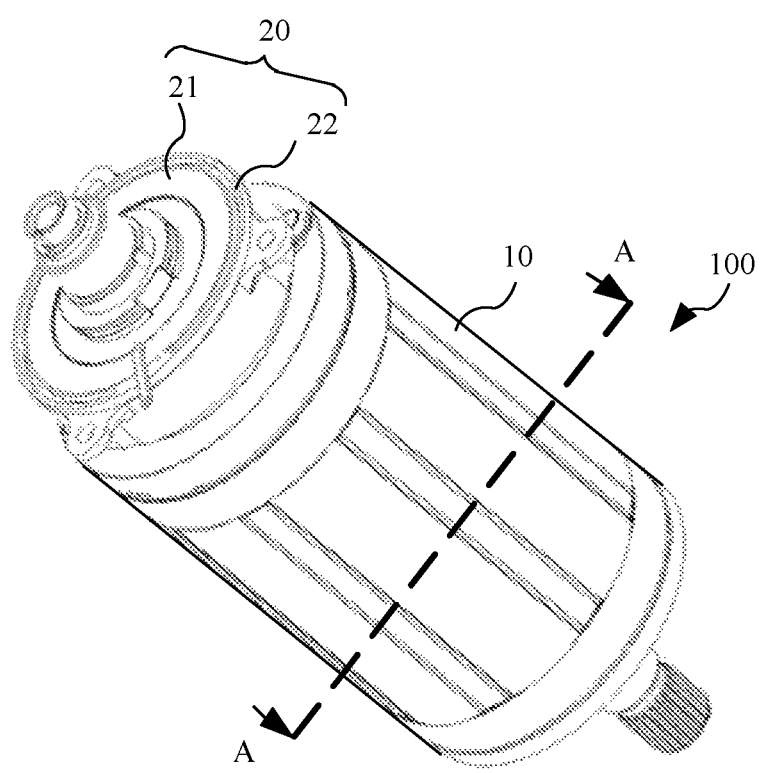
FIG. 1 is a schematic diagram of an overall structure of a motor rotor according to an embodiment of this disclosure.

100—motor rotor; 200—stator;
10—wound rotor; 20—excitation module;
11—rotating shaft; 12—rotor core; 13—rotor coil; 14—first end plate; 15—second end plate; 16—first reinforcement assembly; 17—second reinforcement assembly; 18—rotor jacket; 19—fourth potting adhesive; 21—excitation module rotor; 22—excitation module stator;
111—first shaft hole; 112—second shaft hole; 113—inlet; 114—boss; 121—core body; 122—groove wedge; 123—first heat dissipation channel; 124—first radial channel; 125—first outlet channel; 126—second heat dissipation channel; 127—second outlet channel; 128—winding hole; 131—lead; 132—terminal; 141—heat dissipation groove; 142—mounting hole; 143—annular boss; 161—first potting adhesive; 162—first lantern ring; 163—first end framework; 171—second potting adhesive; 172—second lantern ring; 173—second end framework; 211—excitation transformer rotor; 212—rectifier board; 213—third potting adhesive; 214—third lantern ring; 215—excitation module rotor jacket;
1211—winding groove; 1611—first radial hole; 1621—drainage groove; 1622—perforative hole; 1623—second annular groove; 1631—first annular connection part; 1632—first insulation part; 1633—first limiting part; 1711—second radial hole; 1721—first annular groove; 1731—second annular connection part; 1732—second insulation part; 1733—second limiting part; 2111—transformer rotor core; 2112—transformer rotor coil; and 2121—bolt hole.

DESCRIPTION OF EMBODIMENTS

Terms used in embodiments of this disclosure are only used to explain embodiments of this disclosure, but are not intended to limit this disclosure.

In the conventional technology, a motor includes a stator and a rotor, where the stator is movably sleeved on a periphery of the rotor, and the rotor is connected to loads such as a wheel. During operation, the stator generates a rotating magnetic field in an air gap between the stator and the rotor. When a direct current flows into an excitation winding of the rotor, a stationary magnetic field with constant polarity is generated. Under the action of an armature reaction, the rotor generates a torque relative to the stator, thereby driving a load to move.

It can be learned from an operation process of the motor that the rotor of the motor needs to rotate at a high speed to drive the load to move. Therefore, compared with the stator, a large amount of heat is generated in the operation process. When a temperature of the rotor is excessively high, insulation performance of an insulating material on the rotor is affected, or even a condition that the motor is burnt occurs.

To effectively dissipate heat from the motor, in the conventional technology, the air gap between an inner wall of the stator and an outer wall of the rotor is used as a cooling air duct, and a heat dissipation fan facing the cooling air duct is disposed at one end of the rotor. During heat dissipation, air blown by the heat dissipation fan enters the cooling air duct, and directly contacts a core of the rotor, to indirectly cool the stator and a winding on the core of the rotor through the core, so that the temperature of the rotor and a temperature of the stator of the motor are reduced.

However, the motor uses air cooling heat dissipation, and heat dissipation cannot be effectively performed on the rotor of the motor. Consequently, a useful life of the motor is shortened.

To resolve the foregoing problem, embodiments of this disclosure provide a motor rotor, a motor, and a vehicle. A gap between two adjacent rotor coils is used as a first heat dissipation channel connected to a first shaft hole of a rotating shaft. In this way, coolant introduced into the rotating shaft from an outside enters the first heat dissipation channel from the first shaft hole under the action of centrifugal force, and directly dissipates heat from the rotor coil of a wound rotor. Compared with the air cooling heat dissipation in the conventional technology, heat dissipation efficiency of the rotor coil is effectively improved. In addition, because the coolant is in direct contact with the rotor coil that generates a large amount of heat, a heat dissipation effect on the rotor coil is further improved, a useful life of the motor rotor is prolonged, and stable operation of the motor rotor is ensured.

The following describes in detail the motor rotor in embodiments of this disclosure with reference to accompanying drawings.

Figure 2:
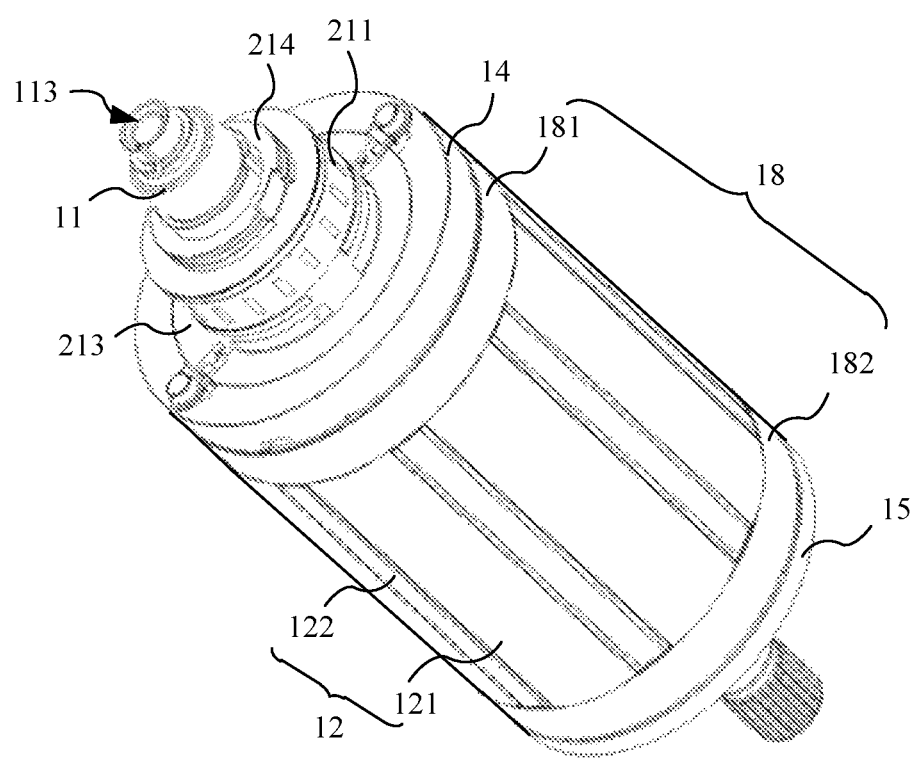
FIG. 2 is a schematic diagram of a partial structure of FIG. 1.
Figure 3:
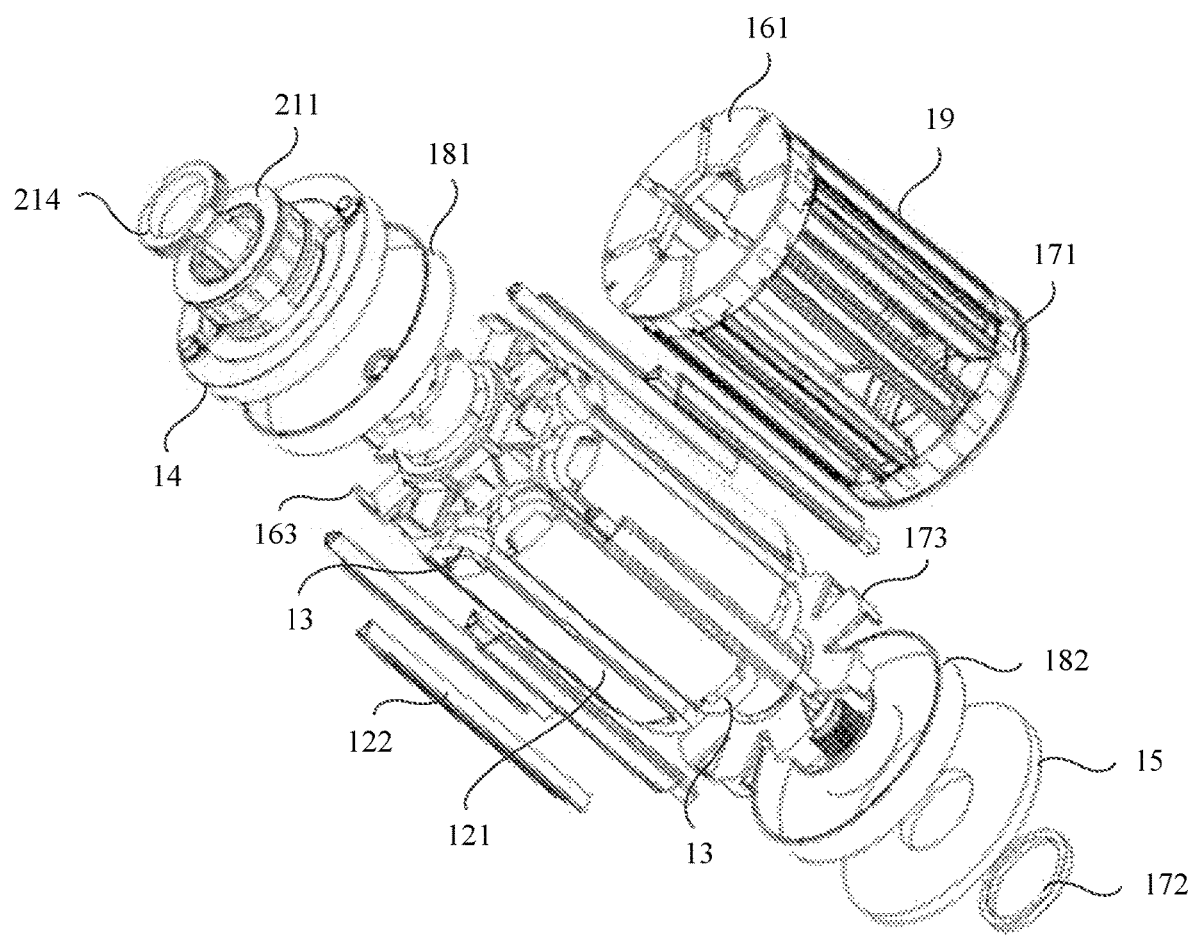
FIG. 3 is an exploded view of FIG. 2.
Figure 4:
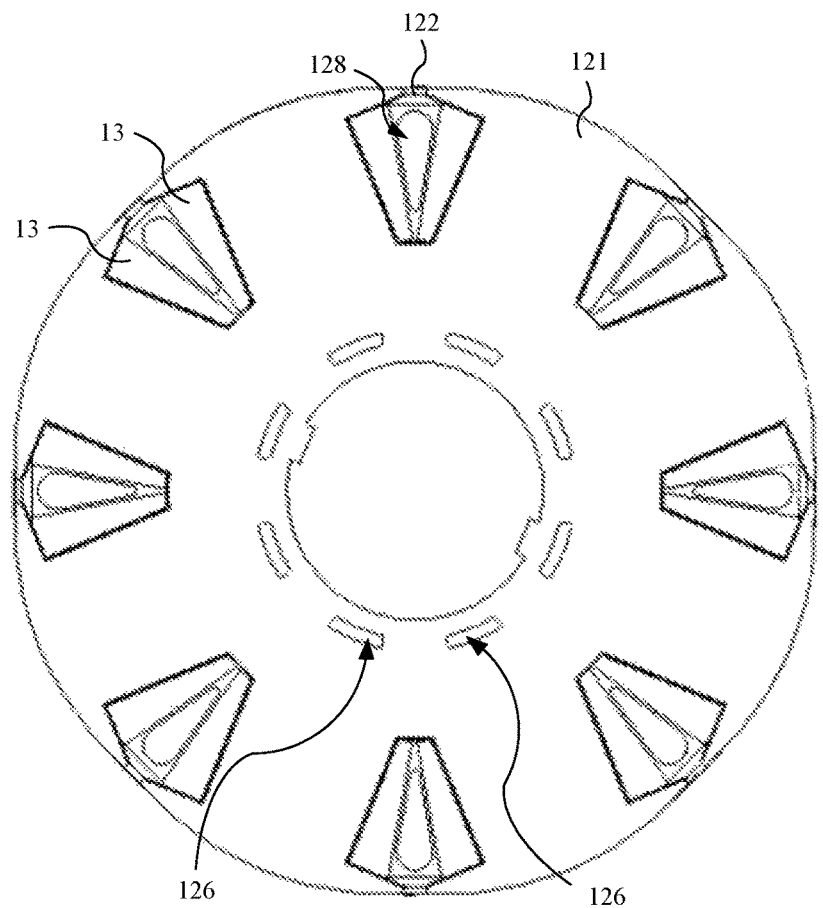
FIG. 4 is a sectional view of FIG. 1 in a direction A-A.
Figure 5:
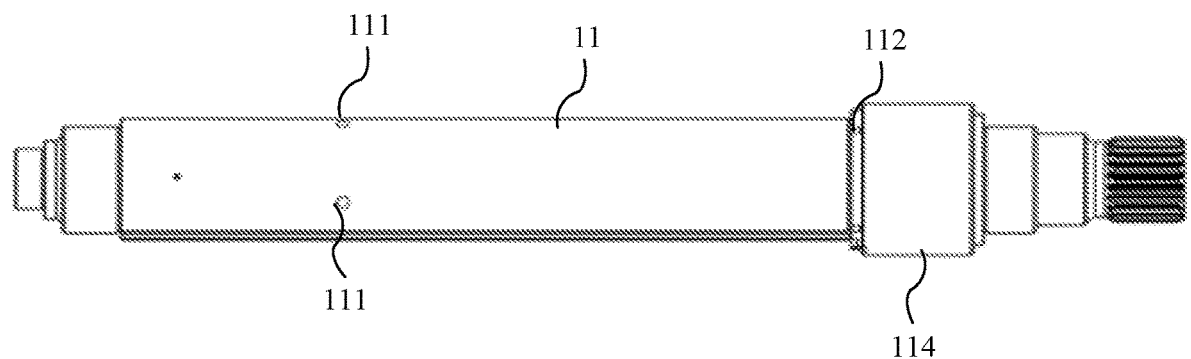
FIG. 5 is a schematic diagram of a structure of a rotating shaft in FIG. 1.
Figure 6:
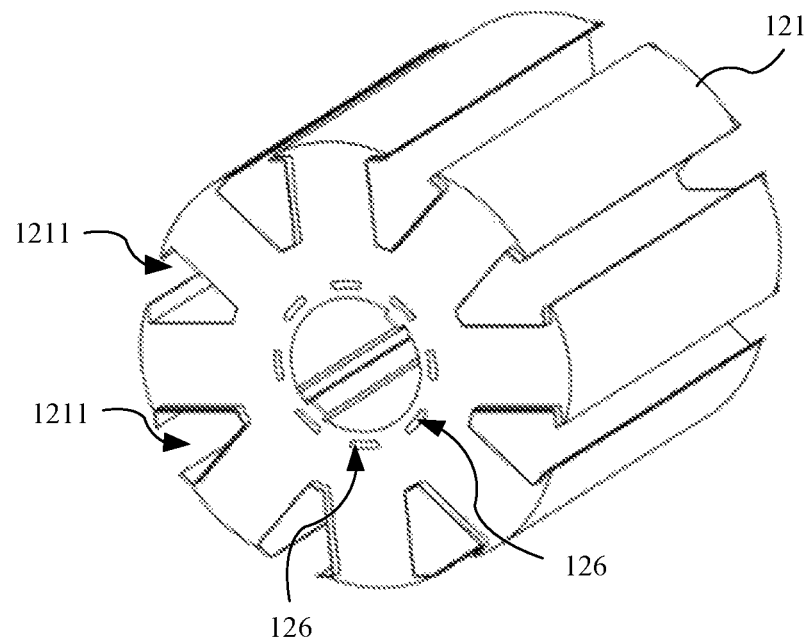
FIG. 6 is a schematic diagram of a structure of a core body in FIG. 1.
Figure 7:
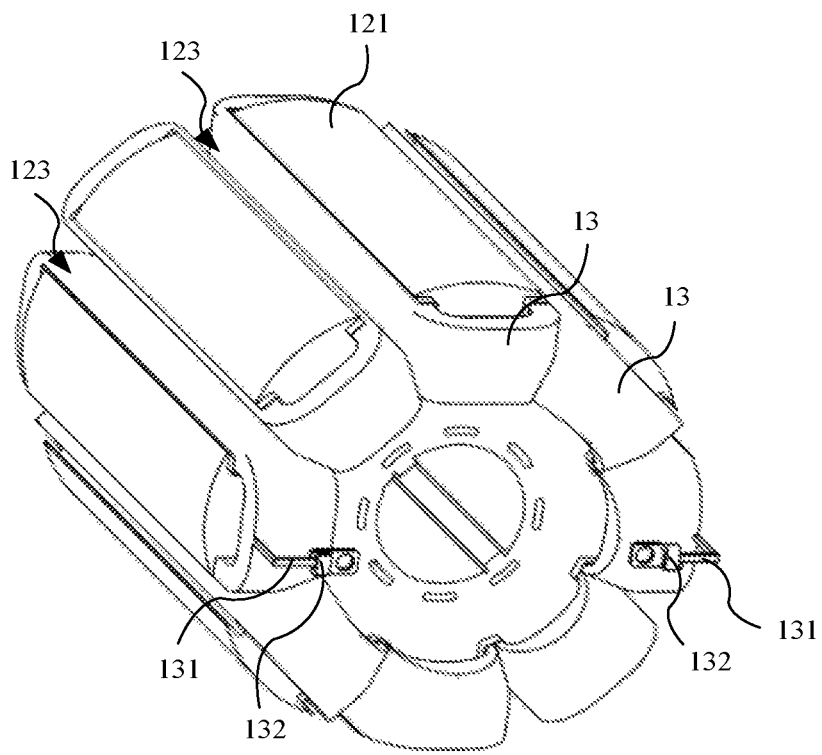
FIG. 7 is an assembly diagram of a core body and a rotor coil in FIG. 1.
Figure 8:
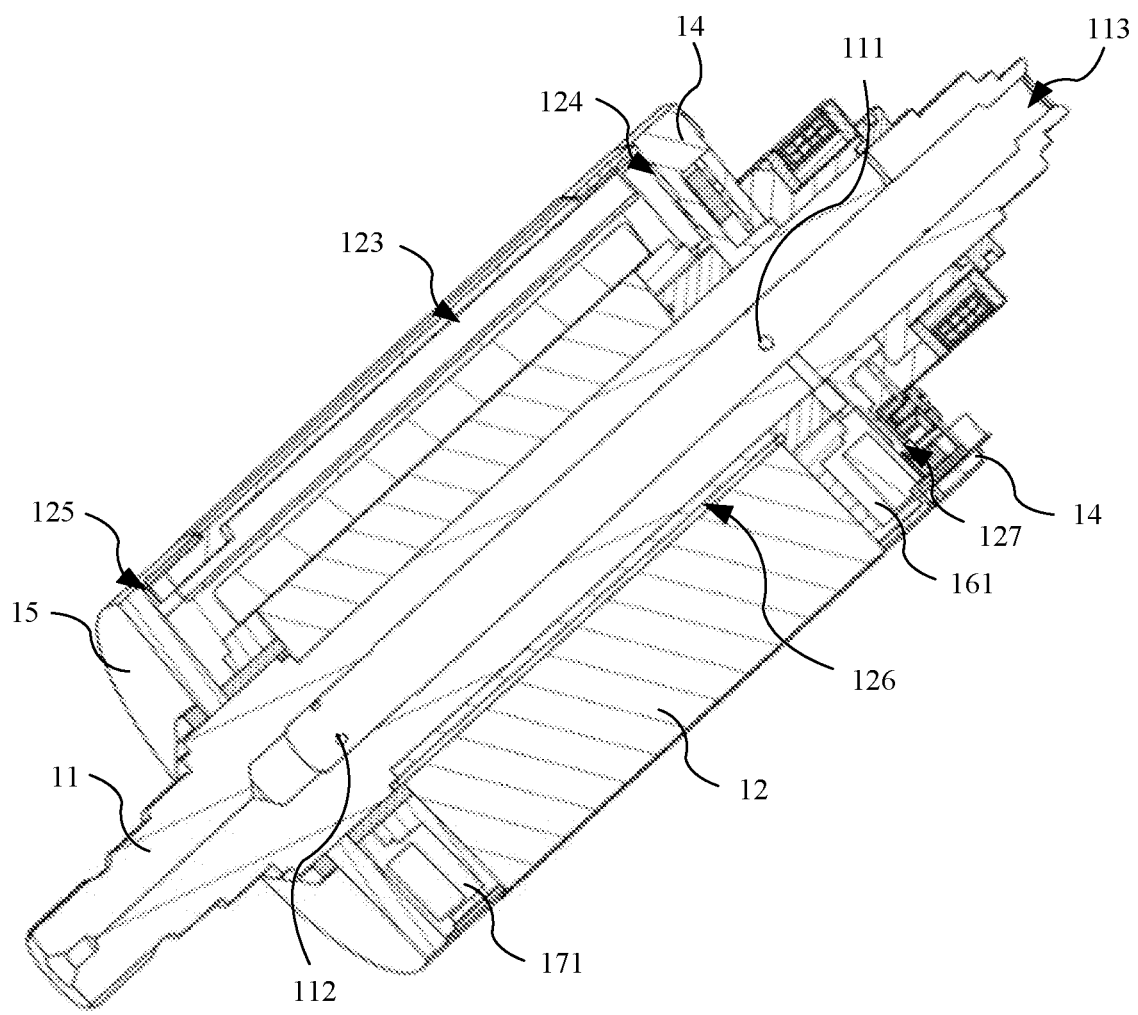
FIG. 8 is a sectional view of FIG. 2 in a radial direction.

FIG. 1 is a schematic diagram of an overall structure of a motor rotor according to an embodiment of this disclosure. FIG. 2 is a schematic diagram of a partial structure of FIG. 1. FIG. 3 is an exploded diagram of FIG. 2. FIG. 4 is a sectional view of FIG. 1 in a direction A-A. FIG. 5 is a schematic diagram of a structure of a rotating shaft in FIG. 1. FIG. 6 is a schematic diagram of a structure of a core body in FIG. 1. FIG. 7 is an assembly diagram of a core body and a rotor coil in FIG. 1. FIG. 8 is a sectional view of FIG. 2 in a radial direction. Refer to FIG. 1. An embodiment of this disclosure provides a motor rotor 100, including a wound rotor 10. The wound rotor 10 is used as a main part of the motor rotor 100, to generate a stationary magnetic field with constant polarity, so that a stator 200 of a motor rotates under the action of a rotating magnetic field to drive a load to move.

In an actual application, a direct current excitation power may be transmitted to the wound rotor 10 by using a rotating contactor, for example, a carbon brush or a slip ring, or an excitation power may be transmitted to the wound rotor 10 by using a power electronic transformer (for example, an excitation module rotor 21 of an excitation module 20 in FIG. 1), so that the wound rotor 10 generates a magnetic field.

Refer to FIG. 2. The wound rotor 10 in this embodiment of this disclosure includes a rotating shaft 11, a rotor core 12, and a plurality of rotor coils 13 (as shown in FIG. 3). The rotor core 12 is fixedly sleeved on the rotating shaft 11. For example, the rotor core 12 may be fastened to the rotating shaft 11 by using a key groove, to limit the rotor core 12 in a circumferential direction of the rotating shaft 11, to ensure that the rotating shaft 11 rotates synchronously with the rotor core 12. Certainly, to simplify an assembly process of the motor rotor 100, the rotor core 12 may be alternatively integrally formed on the rotating shaft 11, to enhance connection strength between the rotor core 12 and the rotating shaft 11, thereby improving mechanical strength of the motor rotor 100.

Refer to FIG. 4. In this embodiment of this disclosure, a plurality of winding holes 128 surrounding the rotating shaft 11 are provided at intervals on the rotor core 12, each winding hole 128 penetrates through two ends that are of the rotor core 12 and that are disposed in an axial direction, each rotor coil 13 is wound on hole walls of two adjacent winding holes 128 (as shown in FIG. 7), and two adjacent rotor coils 13 share one winding hole 128.

In an example in which three winding holes 128 are sequentially provided at intervals around the axial direction of the rotating shaft 11, one rotor coil 13 is wound on a hole wall of a first winding hole 128 and a hole wall of a second winding hole 128, and another rotor coil 13 adjacent to the rotor coil 13 is wound on the hole wall of the second winding hole 128 and a hole wall of a third winding hole 128. In this case, a part of each of the two adjacent rotor coils 13 is disposed in the second winding hole 128. The second winding hole 128 is located between the first winding hole 128 and the third winding hole 128.

Refer to FIG. 3. To ensure effective insulation between the rotor coil 13 and the rotor core 12, an insulation layer 19 is filled on the hole wall of the winding hole 128, and the rotor coil 13 is disposed on one side that is of the insulation layer 19 and that is away from the hole wall. It may be understood that the insulation layer 19 may be directly made of an existing insulating material. Details are not described herein again.

It may be understood that, in this embodiment of this disclosure, there are at least three winding holes 128, to ensure that at least two rotor coils 13 are disposed on the rotor core 12. For example, a quantity of winding holes 128 may be three, six, or eight. In this embodiment of this disclosure, an example in which there are eight winding holes 128 provided at intervals and eight rotor coils 13 is merely used for description.

A cross-sectional shape of the winding hole 128 may be a triangular shape, a quadrilateral shape, or a pentagonal shape.

Refer to FIG. 2 to FIG. 4. In an actual application, the rotor core 12 may include a core body 121 and a plurality of groove wedges 122. Refer to FIG. 6. A plurality of winding grooves 1211 surrounding the rotating shaft 11 are formed on an outer wall of the core body 121, each winding groove 1211 penetrates through two ends that are of the core body 121 and that are disposed in the axial direction, each groove wedge 122 is clamped at a groove opening that is of a corresponding winding groove 1211 and that is away from the rotating shaft 11, and a groove wall of the winding groove 1211 and the groove wedge 122 jointly enclose to form the winding hole 128.

According to the disposition manner of the rotor core 12, the rotor coil 13 can be directly wound on groove walls of two adjacent winding grooves 1211 by using groove openings of the core body 121, thereby improving assembly efficiency between the rotor coil 13 and the core body 121. In addition, each groove wedge 122 is clamped at the groove opening of the winding groove 1211, to prevent the rotor coil 13 from being released from the winding groove 1211.

In some examples, the rotor core 12 is an integral part formed integrally, and the winding hole 128 is formed in the rotor core 12 in a manner of stamping or injection molding.

Still refer to FIG. 7. A gap is formed between two adjacent rotor coils 13, for example, there is a gap, in the axial direction, between parts that are of two adjacent rotor coils 13 and that are in a shared winding hole 128. Refer to FIG. 4 and FIG. 7. A first shaft hole 111 is formed on the rotating shaft 11, the gap between two adjacent rotor coils 13 is configured as a first heat dissipation channel 123 connected to the first shaft hole 111, and the first heat dissipation channel 123 is used for inflow of coolant in the rotating shaft 11. Refer to FIG. 4. It may be understood that the first heat dissipation channel 123 is formed by a part of an inner cavity of the winding hole 128.

For ease of description, an axial direction of each component described below may be the axial direction of the rotating shaft 11.

Because two ends of the winding hole 128 on the rotor core 12 penetrate to, in the axial direction, two end faces that are of the rotor core 12 and that are disposed in the axial direction, the gap (that is, the first heat dissipation channel 123) between two adjacent rotor coils 13 located in a same winding hole 128 also penetrates to the two ends of the rotor core 12 in the axial direction.

The rotating shaft 11 in this embodiment of this disclosure is a hollow structure, and the first shaft hole 111 on the rotating shaft 11 penetrates through a sidewall of the rotating shaft 11, to ensure that two ends of the first shaft hole 111 are respectively connected to an inner cavity of the rotating shaft 11 and the first heat dissipation channel 123.

Refer to FIG. 2. In some examples, an inlet 113 connected to the inner cavity of the rotating shaft 11 may be formed at any end of the rotating shaft 11. For example, the inlet 113 may be disposed at a right end of the rotating shaft 11, and the inlet 113 is connected to an external coolant delivery pipe. In this way, the coolant can be delivered from the inlet 113 of the rotating shaft 11 to the inner cavity of the rotating shaft 11 through the coolant pipe. The coolant may be coolant oil.

During disposition, a projection of the first shaft hole 111 of the rotating shaft 11 on the rotor core 12 may be located in an area between the two ends that are of the rotor core 12 and that are in the axial direction. To implement a connection between the first shaft hole 111 and the first heat dissipation channel 123, a through hole whose two ends are respectively connected to the first shaft hole 111 and the first heat dissipation channel 123 may be provided on the rotor core 12. In this way, the coolant located in the rotating shaft 11 flows from the first shaft hole 111 into the through hole, and flows into the first heat dissipation channel 123 through the through hole, to exchange heat with the rotor coil 13. Therefore, direct heat dissipation of the rotor coil 13 is implemented, and heat dissipation of the rotor core 12 can be indirectly performed by using the rotor coil 13.

It may be understood that, in a high-speed rotation process of the motor rotor 100, the coolant in the rotating shaft 11 may be sprayed at a high speed from the first shaft hole 111 under the action of centrifugal force, and quickly enter the first heat dissipation channel 123. Therefore, flow efficiency of the coolant is improved, and heat dissipation efficiency of the wound rotor 10 is improved.

Refer to FIG. 4 and FIG. 8. In the motor rotor 100 in this embodiment of this disclosure, the gap between two adjacent rotor coils 13 is used as the first heat dissipation channel 123 connected to the first shaft hole 111 of the rotating shaft 11. In this way, the coolant introduced into the rotating shaft 11 from the outside enters the first heat dissipation channel 123 from the first shaft hole 111 under the action of the centrifugal force, and directly dissipates heat from the rotor coil 13 of the wound rotor 10. Compared with air cooling heat dissipation in the conventional technology, heat dissipation efficiency of the rotor coil 13 is effectively improved. In addition, because the coolant is in direct contact with the rotor coil 13 that generates a large amount of heat, a heat dissipation effect on the rotor coil 13 is further improved, a useful life of the motor rotor 100 is prolonged, and stable operation of the motor rotor 100 is ensured. In addition, an excitation load capability of the motor rotor 100 is improved, and a torque density and a power density of the motor are improved.

In addition, compared with a conventional motor, an additional heat dissipation fan does not need to be disposed in a heat dissipation structure of the motor rotor 100 in this embodiment of this disclosure, and the winding hole 128 formed in the rotor core 12 through stamping is directly used as the first heat dissipation channel 123, so that a heat dissipation effect on the motor rotor 100 is improved, a size of the motor rotor 100 is reduced, and a structure of the motor rotor 100 is simplified, thereby improving assembly efficiency of the motor rotor 100.

Refer to FIG. 5. In this embodiment of this disclosure, a plurality of first shaft holes 111 may be provided at intervals on the rotating shaft 11 in a circumferential direction, and a quantity of first shaft holes 111 is equal to or less than a quantity of first heat dissipation channels 123. For example, when the quantity of first heat dissipation channels 123 is eight, eight first shaft holes 111 may be provided at intervals on the rotating shaft 11 in the circumferential direction. In this way, each first heat dissipation channel 123 corresponds to one first shaft hole 111, so that the coolant in the rotating shaft 11 flows into a corresponding first heat dissipation channel 123 after being sprayed from each first shaft hole 111 under the action of the centrifugal force. Certainly, when the quantity of first heat dissipation channels 123 is eight, the quantity of first shaft holes 111 may be a proper value, for example, four, five, six, or seven. Further, a disposition quantity of first shaft holes 111 may be adjusted based on an actual size of the rotating shaft 11 and the like.

In this embodiment of this disclosure, the plurality of first shaft holes 111 are provided on the rotating shaft 11, so that the coolant in the rotating shaft 11 can simultaneously enter the first heat dissipation channels 123 through the plurality of first shaft holes 111, thereby improving flow efficiency of the coolant in the rotating shaft 11 into the first heat dissipation channels 123, and further improving heat dissipation efficiency of the motor rotor 100 in this embodiment of this disclosure.

Refer to FIG. 2 and FIG. 8. The wound rotor 10 in this embodiment of this disclosure may further include a first end plate 14 and a second end plate 15 that are respectively disposed at the two ends that are of the rotor core 12 and that are in the axial direction.

Refer to FIG. 8. That the first end plate 14 is assembled at a right end face that is of the rotor core 12 and that is disposed in the axial direction, and the second end plate 15 is assembled at a left end face that is of the rotor core 12 and that is disposed in the axial direction is used as an example. A first radial channel 124 configured to connect the first shaft hole 111 and the first heat dissipation channel 123 is formed between the rotor core 12 and the first end plate 14. For example, a groove (which is not shown in the figure) may be formed on a surface on one side that is of the first end plate 14 and that faces the rotor core 12, one end of the groove extends to the first shaft hole 111, and the other end of the groove extends to one end that is of the first heat dissipation channel 123 and that is close to the first end plate 14. In this way, when the first end plate 14 is fastened to one end of the rotor core 12, a groove wall of the groove on the first end plate 14 and an end face of the rotor core 12 jointly enclose to form the first radial channel 124, so that the coolant flowing out from the first shaft hole 111 flows from the end that is of the first heat dissipation channel 123 and that is close to the first end plate 14, that is, a right port of the first heat dissipation channel 123, into the first heat dissipation channel 123.

In addition, a first outlet channel 125 connected to the outside of the rotor core 12 is formed between the second end plate 15 and the rotor core 12, and the first heat dissipation channel 123 is connected to the first outlet channel 125. For example, a gap is formed between the second end plate 15 and the left end face of the rotor core 12. The gap may be used as the first outlet channel 125, one end of the gap extends to one end that is of the first heat dissipation channel 123 and that is close to a second end face, that is, a left port of the first heat dissipation channel 123, and the other end of the gap extends to an outer wall of the rotor core 12. In this way, the coolant flowing out from the left port of the first heat dissipation channel 123 can flow to the outside of the rotor core 12 through the gap, thereby ensuring that heated coolant does not affect an operating temperature of the wound rotor 10.

In addition, according to the foregoing disposition manner, the coolant flowing out from the first shaft hole 111 of the rotating shaft 11 can arrive, through the first radial channel 124, one end of the first heat dissipation channel 123, for example, the right port, enter the first heat dissipation channel 123 from one end of the first heat dissipation channel 123, dissipate heat from the rotor coil 13 and the rotor core 12, then enter the first outlet channel 125 from the other end of the first heat dissipation channel 123, that is, the left port, and be discharged to the outside of the rotor core 12 through the first outlet channel 125. In other words, the coolant flowing out from the rotating shaft 11 flows in from one end of the rotor core 12, and is discharged from the other end of the rotor core 12. This lengthens a flow path of the coolant in the first heat dissipation channel 123, increases a contact area between the coolant and the rotor coil 13, and improves a heat dissipation effect on the rotor coil 13 and the rotor core 12.

A manufacturing process of the first radial channel 124 and the first outlet channel 125 is also simplified by disposing the first end plate 14 and the second end plate 15. Therefore, it is ensured that the coolant flowing out from the first shaft hole 111 can effectively enter one end of the first heat dissipation channel 123 and smoothly flow out from the other end of the first heat dissipation channel 123 to the outside of the rotor core 12, and manufacturing efficiency of the wound rotor 10 in this embodiment of this disclosure is improved.

Refer to FIG. 3 and FIG. 8. In the foregoing example, the first end plate 14 is located on the right end face of the rotor core 12, and the second end plate 15 is located on the left end face of the rotor core 12. In another example, the first end plate 14 may be alternatively located on the left end face of the rotor core 12, and the second end plate 15 may be located on the right end face of the rotor core 12. It may be understood that, when the inlet 113 of the rotating shaft 11 is located on the right end of the rotating shaft 11, the first end plate 14 may be located at one end that is of the rotating shaft 11 and that is close to the inlet 113, or may be located at one end that is of the rotating shaft 11 and that is away from the inlet 113. Specific positions of disposing the first end plate 14 and the second end plate 15 are not limited in this embodiment of this disclosure. For ease of description, the following describes the structure of the motor rotor 100 with an example in which the inlet 113 of the rotating shaft 11 is located at the right end of the rotating shaft 11, and the first end plate 14 is located on the right end face of the rotor core 12.

In this embodiment of this disclosure, during assembly, the first end plate 14 may be directly fastened to the right end face of the rotor core 12, to seal the right port of the first heat dissipation channel 123 and form the first radial channel 124. For example, the first end plate 14 may be integrally formed on the right end face of the rotor core 12 through injection molding, and the first radial channel 124 is integrally formed between the first end plate 14 and the right end face of the rotor core 12. In this way, a structure of the wound rotor 10 can be simplified, assembly efficiency of the wound rotor 10 can be improved, and connection strength between the first end plate 14 and the rotor core 12 can be enhanced. Certainly, in some examples, the first end plate 14 may be alternatively fastened to the right end face of the rotor core 12 in a detachable manner, for example, through threaded connection or clamping, to detach and replace the first end plate 14.

Figure 9:
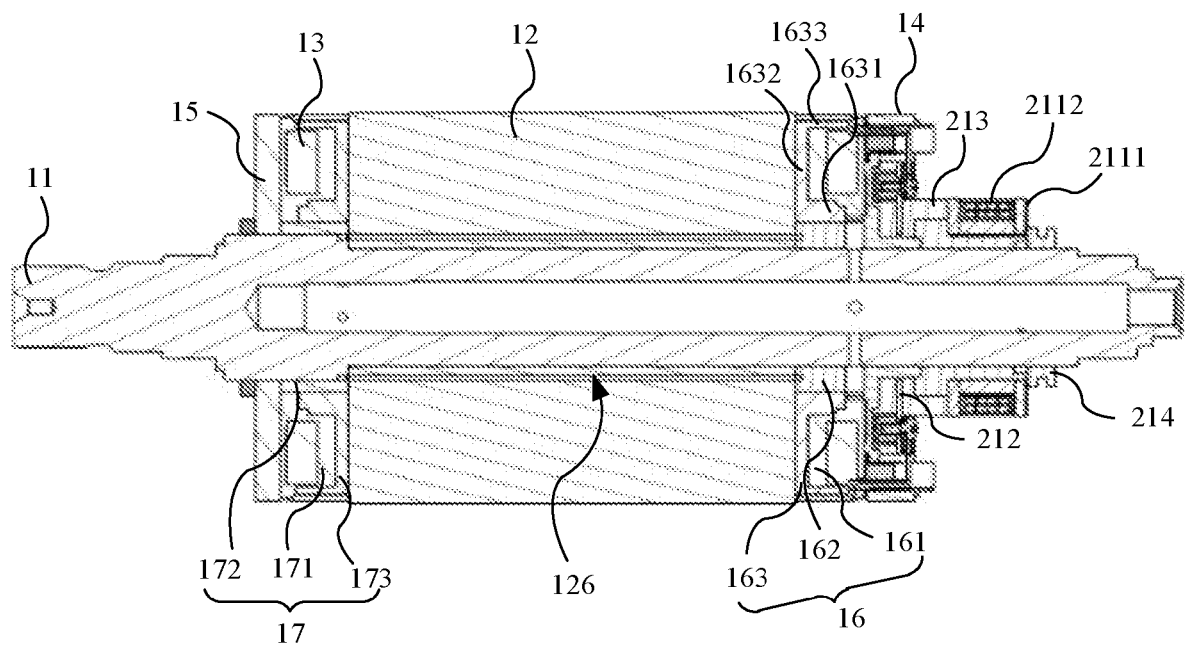
FIG. 9 is another sectional view of FIG. 2 in a radial direction.

FIG. 9 is another sectional view of FIG. 2 in a radial direction. Refer to FIG. 9. The wound rotor 10 in this embodiment of this disclosure may further include a first reinforcement assembly 16. The first reinforcement assembly 16 is disposed between the first end plate 14 and the rotor core 12. For example, one end of the first reinforcement assembly 16 is connected to the right end face of the rotor core 12, and the other end of the first reinforcement assembly 16 is connected to the first end plate 14. In other words, the first end plate 14 is fastened to the right end face of the rotor core 12 by using the first reinforcement assembly 16, and the first radial channel 124 is disposed between the first reinforcement assembly 16 and the first end plate 14.

In this embodiment of this disclosure, the first reinforcement assembly 16 is disposed between the first end plate 14 and one end of the rotor core 12, to enhance structural strength of the wound rotor 10 in a rotation process, and ensure structural stability in a high-speed operation process of the wound rotor 10 formed through assembly of components such as the rotating shaft 11 and the rotor core 12.

Figure 10:
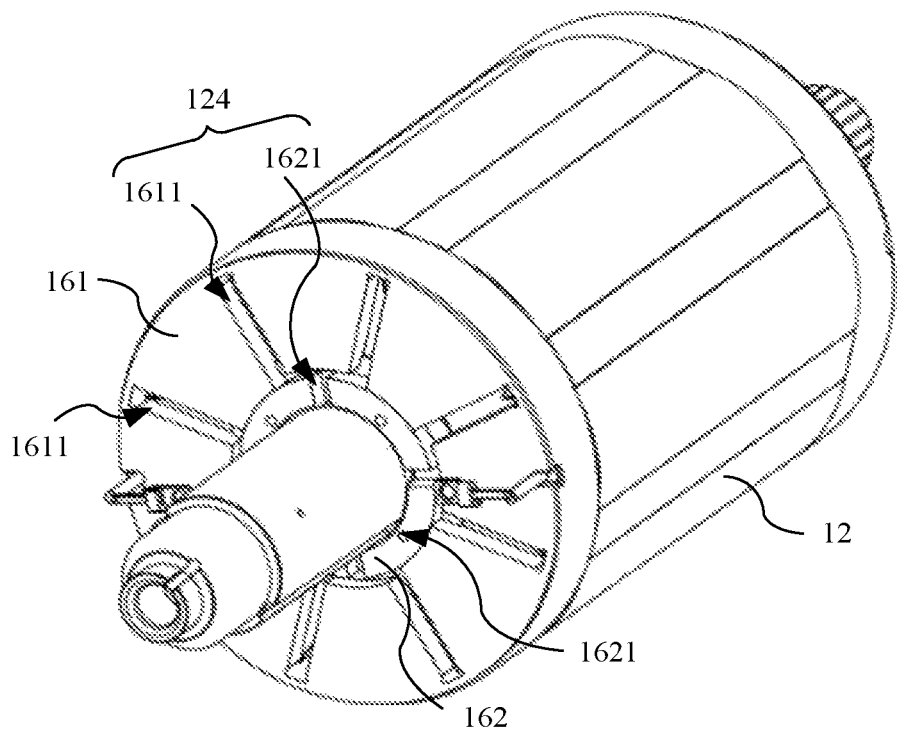
FIG. 10 is a schematic diagram of a structure of a wound rotor in FIG. 2 in a first perspective.

FIG. 10 is a schematic diagram of a structure of the wound rotor in FIG. 2 in a first perspective. Refer to FIG. 3, FIG. 9, and FIG. 10. The first reinforcement assembly 16 may include a first potting adhesive 161, for example, the first potting adhesive 161 is filled in a gap between the first end plate 14 and the right end face of the rotor core 12, to enhance mechanical structural strength of the entire wound rotor 10.

The first potting adhesive 161 may be a liquid polyurethane compound. The first potting adhesive 161 is solidified into a thermosetting polymer insulating material at a normal temperature or after being heated, to implement an insulation function between both of the rotor core 12 and the rotor coil 13 disposed on the rotor core 12 and the first end plate 14.

Still refer to FIG. 8 to FIG. 10. A plurality of first radial holes 1611 surrounding the rotating shaft 11 are provided at intervals on the first potting adhesive 161, the first radial hole 1611 separately extends to the first heat dissipation channel 123 and the first end plate 14 in the axial direction, and the first radial channel 124 includes at least a part that is of the first radial hole 1611 and that extends in the radial direction. The first radial holes 1611 are provided in a one-to-one correspondence with the first heat dissipation channels 123. The coolant flowing out from the first shaft hole 111 may be first drained to one end that is of the first radial hole 1611 and that is away from the first heat dissipation channel 123 through the part that is of each of the plurality of first radial holes 1611 and that extends in the radial direction, and then flow into a corresponding first heat dissipation channel 123 in an axial extension direction of the first radial hole 1611.

In this embodiment of this disclosure, the first radial hole 1611 connected to the first heat dissipation channel 123 is formed on the first potting adhesive 161, so that the coolant flowing out from the first shaft hole 111 can effectively enter the first heat dissipation channel 123. One end that is of the first radial hole 1611 and that extends in the radial direction may extend to one end that is of the first heat dissipation channel 123 and that is away from the rotating shaft 11, to increase a flow rate of the coolant entering the first heat dissipation channel 123 from the first radial hole 1611, thereby improving flow efficiency of the coolant in the wound rotor 10, and further improving the heat dissipation efficiency of the wound rotor 10.

During disposition, a quantity of first radial holes 1611 may be equal to the quantity of first shaft holes 111. One end that is of each first radial hole 1611 and that is in the radial direction penetrates to a corresponding first shaft hole 111. For example, eight first shaft holes 111 and eight first radial holes 1611 are provided, and each first shaft hole 111 is connected to one first radial hole 1611. In this way, the coolant flowing out from each first shaft hole 111 can enter each first heat dissipation channel 123 through a corresponding first radial hole 1611, thereby improving flow efficiency of the coolant from the first shaft hole 111 of the rotating shaft 11 to each first heat dissipation channel 123.

Refer to FIG. 10. In some examples, the quantity of first shaft holes 111 may alternatively be less than the quantity of first radial holes 1611. For example, when there are eight first radial holes 1611, the quantity of first shaft holes 111 may be a proper value, for example, four, five, or six. Each first shaft hole 111 may be connected to one or more first radial holes 1611 by using a drainage groove 1621 or the like, provided that it is ensured that the coolant flowing out from each first shaft hole 111 can smoothly flow into each first heat dissipation channel 123.

Still refer to FIG. 10. The first reinforcement assembly 16 in this embodiment of this disclosure may further include a first lantern ring 162 fixedly sleeved on the rotating shaft 11, where the first lantern ring 162 is fastened on a right end of the rotor core 12, and the first potting adhesive 161 is disposed on a periphery of the first lantern ring 162.

The first lantern ring 162 is disposed to limit the rotor core 12 in the axial direction, thereby ensuring stability of the rotor core 12 on the rotating shaft 11 in the high-speed rotation process.

Refer to FIG. 8 to FIG. 10. The first radial channel 124 in this embodiment of this disclosure may further include a plurality of drainage grooves 1621 that surround the rotating shaft 11 and that are disposed at intervals on the first lantern ring 162. For example, one side that is of the first lantern ring 162 and that is away from the rotor core 12 is recessed to form the plurality of drainage grooves 1621, each drainage groove 1621 is disposed corresponding to the first shaft hole 111, a first end of each drainage groove 1621 extends to a corresponding first shaft hole 111, and a second end of the drainage groove 1621 is connected to the first radial hole 1611. In this way, the coolant flowing out from the first shaft hole 111 can enter the first radial hole 1611 of the first potting adhesive 161 through each drainage groove 1621, and can be finally drained into the first heat dissipation channel 123 through the first radial hole 1611. This improves the flow efficiency of the coolant from the rotating shaft 11 to each first heat dissipation channel 123, and reduces a loss of the coolant on a path from the first shaft hole 111 to the first heat dissipation channel 123.

When the quantity of first shaft holes 111 is less than the quantity of first radial holes 1611, one drainage groove 1621 may be connected between two adjacent first radial holes 1611. In this way, the coolant flowing out from the drainage groove 1621 can separately flow into the first radial holes 1611 on both sides, and then flow into the first heat dissipation channel 123. According to this disposition, a structure of the rotating shaft 11 and the first lantern ring 162 is simplified, thereby improving manufacturing efficiency of the wound rotor 10.

A gap may be formed between the first lantern ring 162 and a part that is of the first potting adhesive 161 and that faces each drainage groove 1621, and two ends of each gap respectively extend to the first radial holes 1611 on two adjacent sides of the drainage groove 1621. In this way, the coolant drained out from each drainage groove 1621 can smoothly enter the first radial holes 1611 on the two sides through the gap. Therefore, structure disposition of the wound rotor 10 is simplified, a loss amount of the coolant on the first radial channel 124 is reduced, and it is ensured that the coolant is quickly drained from each first shaft hole 111 to each first heat dissipation channel 123.

It may be understood that the gap between the first potting adhesive 161 and the first lantern ring 162 may be a through hole that is provided in a stamping manner or the like, or certainly, may be a gap reserved when the first potting adhesive 161 is filled. A manner of disposing the gap is not limited in this embodiment of this disclosure.

Refer to FIG. 9. The wound rotor 10 in this embodiment of this disclosure may further include a second reinforcement assembly 17. The second reinforcement assembly 17 is disposed between the second end plate 15 and the rotor core 12. For example, the second reinforcement assembly 17 is disposed on the left end face of the rotor core 12, and the first outlet channel 125 is disposed between the second reinforcement assembly 17 and the second end plate 15.

In this embodiment of this disclosure, the second reinforcement assembly 17 is disposed between the second end plate 15 and the rotor core 12, to further enhance the structural strength of the wound rotor 10 in the rotation process, and ensure the structural stability in the high-speed operation process of the wound rotor 10 formed through assembly of components such as the rotating shaft 11 and the rotor core 12.

Figure 11:
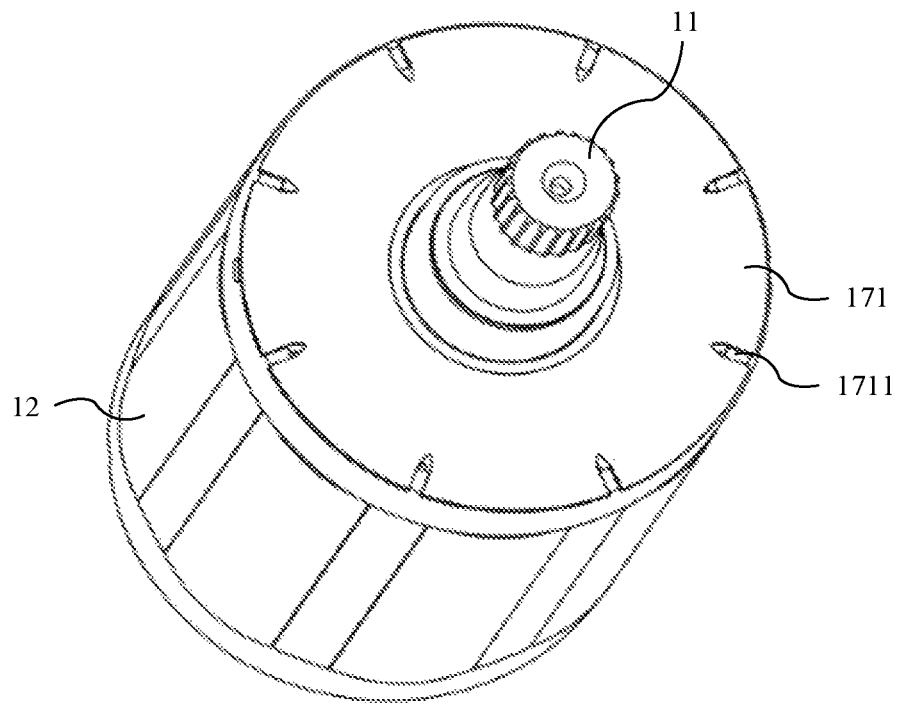
FIG. 11 is a schematic diagram of a structure of a wound rotor in FIG. 2 in a second perspective.

FIG. 11 is a schematic diagram of a structure of the wound rotor in FIG. 2 in a second perspective. Refer to FIG. 3, FIG. 9, and FIG. 11. Optionally, the second reinforcement assembly 17 may include a second potting adhesive 171. For example, the second potting adhesive 171 is filled between the second end plate 15 and the left end face of the rotor core 12, to enhance connection strength between the rotor core 12 and the second end plate 15, and improve the structural strength of the wound rotor 10.

Refer to FIG. 8 and FIG. 11. A plurality of second radial holes 1711 surrounding the rotating shaft 11 are provided at intervals on the second potting adhesive 171, two ends that are of the second radial hole 1711 and that are in the axial direction respectively extend to the first heat dissipation channel 123 and the second end plate 15, and at least a part that is of the second radial hole 1711 and that extends in the radial direction is configured as the first outlet channel 125.

One end that is of the second radial hole 1711 and that extends in the radial direction may extend to an outer edge that is of the second potting adhesive 171 and that is away from the rotating shaft 11, and the other end that is of the second radial hole 1711 and that extends in the radial direction may extend to be flush with one end that is of the first heat dissipation channel 123 and that is close to the rotating shaft 11, or may extend to an extension direction inside the first heat dissipation channel 123, provided that it is ensured that the coolant flowing out from a left end of the first heat dissipation channel 123 can be discharged to the outside of the rotor core 12 from the second radial hole 1711.

In this embodiment of this disclosure, the second radial hole 1711 connected to the first heat dissipation channel 123 is formed on the second potting adhesive 171, so that the coolant flowing out from the first heat dissipation channel 123 can be smoothly discharged to the outside of the rotor core 12 through the second radial hole 1711.

In addition, the second radial hole 1711 configured to drain out the coolant is formed on the second potting adhesive 171, so that structure disposition of the first outlet channel 125 is more convenient and simpler.

In this embodiment of this disclosure, a material of the second potting adhesive 171 and a material of the first potting adhesive 161 are the same, and each may be a liquid polyurethane compound.

To enable the coolant discharged from a second outlet channel 127 to dissipate heat on an outer surface of the rotor core 12, a drainage groove (which is not shown in the figure) may be formed on a part that is of the outer surface of the rotor core 12 and that corresponds to the winding hole 128. That is, a projection of the drainage groove inside the rotor core 12 is located in the winding hole 128. Two ends of the drainage groove respectively extend to two ends that are of the winding hole 128 and that are disposed in the axial direction. In this way, at least a part of the coolant flowing out from the first heat dissipation channel 123 enters the drainage groove through the first outlet channel 125. Through drainage of the drainage groove, the coolant discharged from an inside of the rotor core 12 can stably flow on the outer surface of the rotor core 12, thereby dissipating heat from the rotor core 12.

In an actual application, the stator 200 of the motor is sleeved on a periphery of the rotor core 12, and the coolant flowing in the drainage groove of the rotor core 12 can further dissipate heat from the stator 200. Therefore, the heat dissipation effect on the motor rotor 100 and the motor in this embodiment of this disclosure is further improved, and the excitation load capability of the rotor is improved.

Refer to FIG. 4, FIG. 6, and FIG. 8. A plurality of second heat dissipation channels 126 surrounding the rotating shaft 11 are disposed at intervals on the rotor core 12. The second heat dissipation channel 126 is located between the rotating shaft 11 and the first heat dissipation channel 123, and the second heat dissipation channel 126 penetrates through the two ends that are of the rotor core 12 and that are disposed in the axial direction. For example, the second heat dissipation channel 126 extends to the left end face and the right end face of the rotor core 12 in the axial direction, and a second shaft hole 112 connected to the second heat dissipation channel 126 is formed on the rotating shaft 11. In this way, in the high-speed rotation process of the rotating shaft 11, the coolant located in the rotating shaft 11 can flow out from a plurality of second shaft holes 112 and enter the second heat dissipation channels 126, to directly dissipate heat from the rotor core 12, thereby further improving the heat dissipation efficiency of the wound rotor 10, and ensuring the stable operation of the motor rotor 100.

A projection of the second shaft hole 112 of the rotating shaft 11 on the rotor core 12 may be located in the area between the two ends that are of the rotor core 12 and that are in the axial direction. To implement a connection between the second shaft hole 112 and the second heat dissipation channel 126, a through hole whose two ends are respectively connected to the second shaft hole 112 and the second heat dissipation channel 126 may be provided on the rotor core 12. In this way, the coolant located in the rotating shaft 11 flows from the second shaft hole 112 into the through hole, and flows into the second heat dissipation channel 126 through the through hole, to exchange heat with the rotor coil 13. Therefore, direct heat dissipation of the rotor coil 13 is implemented, and heat dissipation of the rotor core 12 can be indirectly performed by using the rotor coil 13.

In some examples, the projection of the second shaft hole 112 on the rotor core 12 may be alternatively located between the rotor core 12 and the second potting adhesive 171. For example, the projection of the second shaft hole 112 on the rotor core 12 is located on a left port of a second channel, and the through hole is provided between the left end face of the rotor core 12 and the second potting adhesive 171. In this way, the coolant in the rotating shaft 11 can flow into the through hole from the second shaft hole 112, and then flow into the second heat dissipation channel 126 from a left port of the second heat dissipation channel 126, to directly exchange heat with the rotor core 12.

During disposition, a quantity of second shaft holes 112 may be equal to or less than a quantity of second heat dissipation channels 126. For example, when the quantity of second heat dissipation channels 126 is eight, eight second shaft holes 112 may be provided at intervals on the rotating shaft 11 in the circumferential direction. In this way, each second heat dissipation channel 126 corresponds to one second shaft hole 112, so that the coolant in the rotating shaft 11 flows into a corresponding second heat dissipation channel 126 after being sprayed from each second shaft hole 112 under the action of the centrifugal force. Certainly, when the quantity of second heat dissipation channels 126 is eight, the quantity of second shaft holes 112 may be a proper value, for example, four, five, six, or seven. Further, a disposition quantity of second shaft holes 112 may be adjusted based on an actual size of the rotating shaft 11 and the like.

Figure 12:
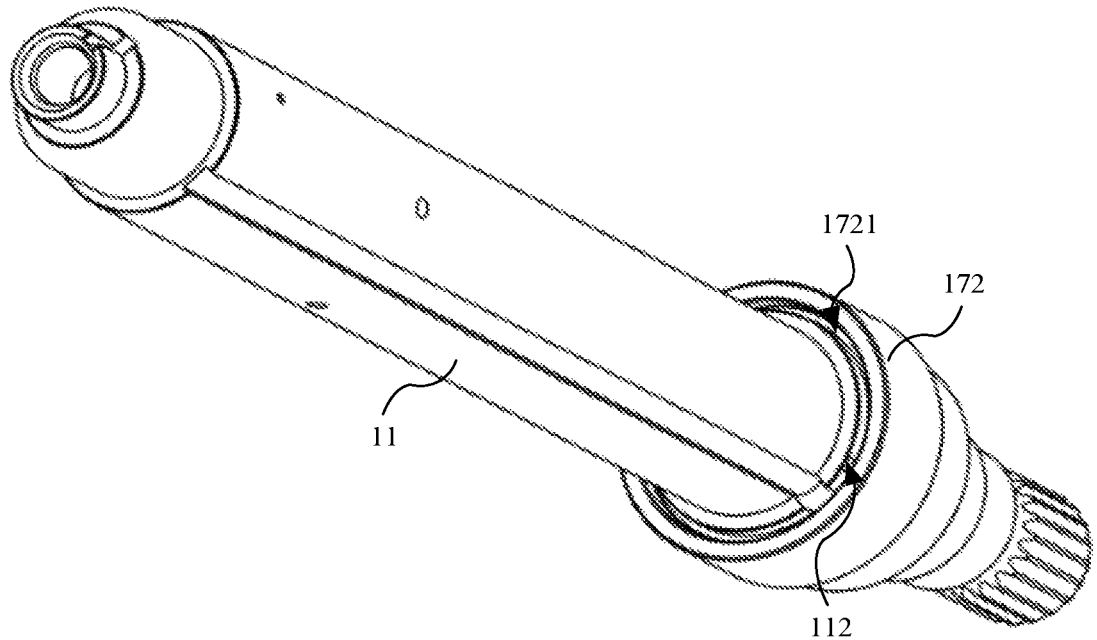
FIG. 12 is an assembly diagram of a rotating shaft and a second lantern ring in FIG. 1.

FIG. 12 is an assembly diagram of the rotating shaft and a second lantern ring in FIG. 1. Refer to FIG. 3 and FIG. 12. The second reinforcement assembly 17 in this embodiment of this disclosure further includes a second lantern ring 172 fixedly sleeved on the rotating shaft 11. The second lantern ring 172 is located on the left end face (as shown in FIG. 9) of the rotor core 12, and is disposed between the rotating shaft 11 and the second potting adhesive 171, to further limit the rotor core 12 in the axial direction of the rotating shaft 11, thereby ensuring the stability of the rotor core 12 on the rotating shaft 11 in the high-speed rotation process.

The second lantern ring 172 may be fixedly sleeved on the rotating shaft 11 by using a key groove, to ensure that the second lantern ring 172 rotates synchronously with the rotating shaft 11.

Refer to FIG. 12. To ensure that the coolant flowing out from the second shaft hole 112 can smoothly enter the second heat dissipation channel 126, a first annular groove 1721 may be formed between the second lantern ring 172 and the rotating shaft 11, and the second shaft hole 112 and one end that is of the second heat dissipation channel 126 and that faces the second lantern ring 172 are located in the first annular groove 1721. In this way, the coolant flowing out from the second shaft hole 112 first enters the first annular groove 1721, and the coolant smoothly enters the second heat dissipation channel 126 in a buffer process of the first annular groove 1721, thereby avoiding a loss of the coolant in a process of flowing into the second heat dissipation channel 126.

The first annular groove 1721 may be formed in the following two manners: Refer to FIG. 5 and FIG. 12. In a first feasible implementation, a boss 114 may be formed on a periphery of the rotating shaft 11. The boss 114 is located on one side that is of the second shaft hole 112 and that is away from the rotor core 12, a part of the second lantern ring 172 is fastened to the boss 114, the other part of the second lantern ring 172 extends over the second shaft hole 112, and the part that is of the second lantern ring 172 and that is above the second shaft hole 112, an outer wall of the rotating shaft 11, and a sidewall of the boss 114 jointly enclose to form the first annular groove 1721.

In a second feasible implementation, the first annular groove 1721 may be directly disposed on an inner side that is of the second lantern ring 172 and that faces the rotating shaft 11, and both the second shaft hole 112 and the left port of the second heat dissipation channel 126 are accommodated in the first annular groove 1721, to ensure that the coolant flowing out from the second shaft hole 112 can be distributed into each second heat dissipation channel 126.

Refer to FIG. 8. In this embodiment of this disclosure, a second outlet channel 127 connected to the outside of the rotor core 12 may be formed between the first potting adhesive 161 and the first end plate 14.

Figure 13:
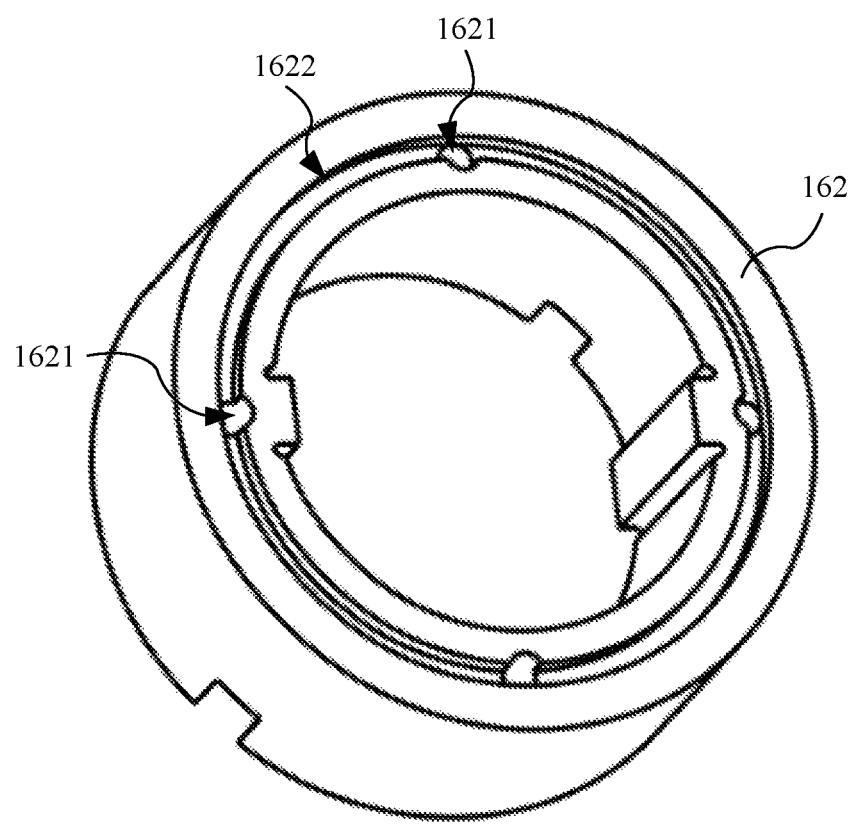
FIG. 13 is a schematic diagram of a structure of a first lantern ring in FIG. 10.

FIG. 13 is a schematic diagram of a structure of the first lantern ring in FIG. 10. Refer to FIG. 9, FIG. 10, and FIG. 13. In this embodiment of this disclosure, when being assembled, the first lantern ring 162 is disposed on the right end face of the rotor core 12 and is located at a right port of the second heat dissipation channel 126. In this embodiment of this disclosure, a perforative hole 1622 is formed on the first lantern ring 162 in an extension direction of the rotating shaft 11, and two ends of the perforative hole 1622 are respectively connected to the second heat dissipation channel 126 and the second outlet channel 127. In this way, the coolant flowing out from the right port of the second heat dissipation channel 126 enters the second outlet channel 127 through the perforative hole 1622 of the first lantern ring 162, and is finally drained to the outside of the rotor core 12.

In addition, the second outlet channel 127 connected to the outside is formed between the first potting adhesive 161 and the first end plate 14, to ensure that the coolant flowing out from the second heat dissipation channel 126 can smoothly flow to the outside of the rotor core 12, so that disposition of the second outlet channel 127 is more convenient and faster, thereby improving the manufacturing efficiency of the wound rotor 10. In addition, the coolant flows in from the left port of the second heat dissipation channel 126, and flows out from the right port of the second heat dissipation channel 126, to further lengthen the flow path of the coolant in the rotor core 12, thereby improving the heat dissipation efficiency of the coolant to the rotor core 12.

Certainly, when the first lantern ring 162 is located between the right port of the second heat dissipation channel 126 and the rotating shaft 11, and the first potting adhesive 161 is disposed at the right port of the second heat dissipation channel 126, the perforative hole 1622 may be directly provided on the first potting adhesive 161, to ensure that the coolant flowing out from the second heat dissipation channel 126 enters the second outlet channel 127 between the first potting adhesive 161 and the first end plate 14, and then is discharged to the outside of the rotor core 12.

Refer to FIG. 6 and FIG. 10. A quantity of perforative holes 1622 on the first lantern ring 162 may be less than the quantity of second heat dissipation channels 126. For example, when the quantity of second heat dissipation channels 126 is eight, the quantity of perforative holes 1622 may be a proper value, for example, four, five, or six. In this way, a manufacturing process of the first lantern ring 162 is simplified, and flow efficiency of the coolant entering the second outlet channel 127 from the second heat dissipation channel 126 is reduced, so that the coolant flowing out from the perforative hole 1622 can gradually dissipate heat from the first end plate 14. That is, contact duration between the coolant and the first end plate 14 is prolonged, so that a heat dissipation effect, on the first end plate 14, of the coolant flowing out from the second heat dissipation channel 126 is improved.

Still refer to FIG. 13. Optionally, a second annular groove 1623 surrounding the rotating shaft 11 is disposed on one side that is of the first lantern ring 162 and that faces the second heat dissipation channel 126, and the perforative hole 1622 on the first lantern ring 162 is located in the second annular groove 1623. In this way, the coolant flowing out from each second heat dissipation channel 126 can smoothly enter the perforative hole 1622 in a buffer process of the second annular groove 1623, thereby reducing a loss of the coolant in a flow process of flowing into the perforative hole 1622 from the second heat dissipation channel 126.

In this embodiment of this disclosure, the second outlet channel 127 and the first radial channel 124 are disposed in a staggered manner. For example, refer to FIG. 10. The perforative hole 1622 connected to the second outlet channel 127 and the drainage groove 1621 on the first lantern ring 162 are disposed in a staggered manner. In this way, a flow path of the first heat dissipation channel 123 and a flow path of the second heat dissipation channel 126 are independent of each other. That is, after exchanging heat with the rotor core 12, the coolant can be directly discharged to the outside of the rotor core 12 after entering the second outlet channel 127 without entering the first heat dissipation channel 123 through the first radial channel 124, so that heated coolant is prevented from affecting the heat dissipation effect on the rotor coil 13. In addition, at least a part of the coolant entering the first radial channel 124 from the first shaft hole 111 is prevented from flowing out from the second outlet channel 127 to the outside of the rotor core 12 before entering the first heat dissipation channel 123, so that normal heat dissipation of the wound rotor 10 is prevented from being affected.

Figure 14:
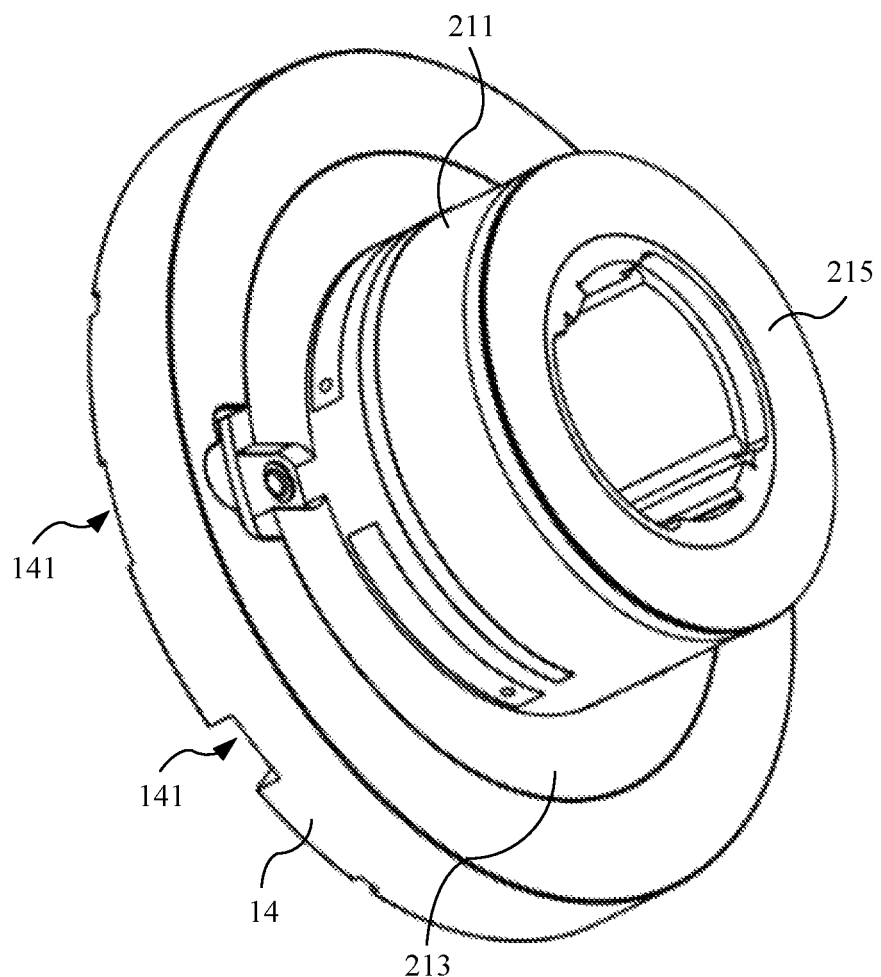
FIG. 14 is an assembly diagram of a first end plate and an excitation module in FIG. 2.

FIG. 14 is an assembly diagram of the first end plate and the excitation module in FIG. 2. Refer to FIG. 8 and FIG. 14. In this embodiment of this disclosure, during disposition, the second outlet channel 127 may include a heat dissipation groove 141 formed on one side that is of the first end plate 14 and that faces the first potting adhesive 161. In this way, the coolant flowing out from the perforative hole 1622 enters the heat dissipation groove 141, and is drained to the outside of the rotor core 12 through the heat dissipation groove 141, so that a structure of the second outlet channel 127 is simplified, disposition of the second outlet channel 127 is more convenient and faster, and a contact area between the coolant and the first end plate 14 is increased. Therefore, the coolant flowing out from the second heat dissipation channel 126 to the second outlet channel 127 can effectively dissipate heat from the first end plate 14.

During disposition, the heat dissipation groove 141 may have a plurality of bent parts in a radial direction of the first end plate 14, to lengthen a length of the heat dissipation groove 141, thereby increasing the contact area between the coolant and the first end plate 14, and improving a heat dissipation effect on the first end plate 14.

Figure 15:
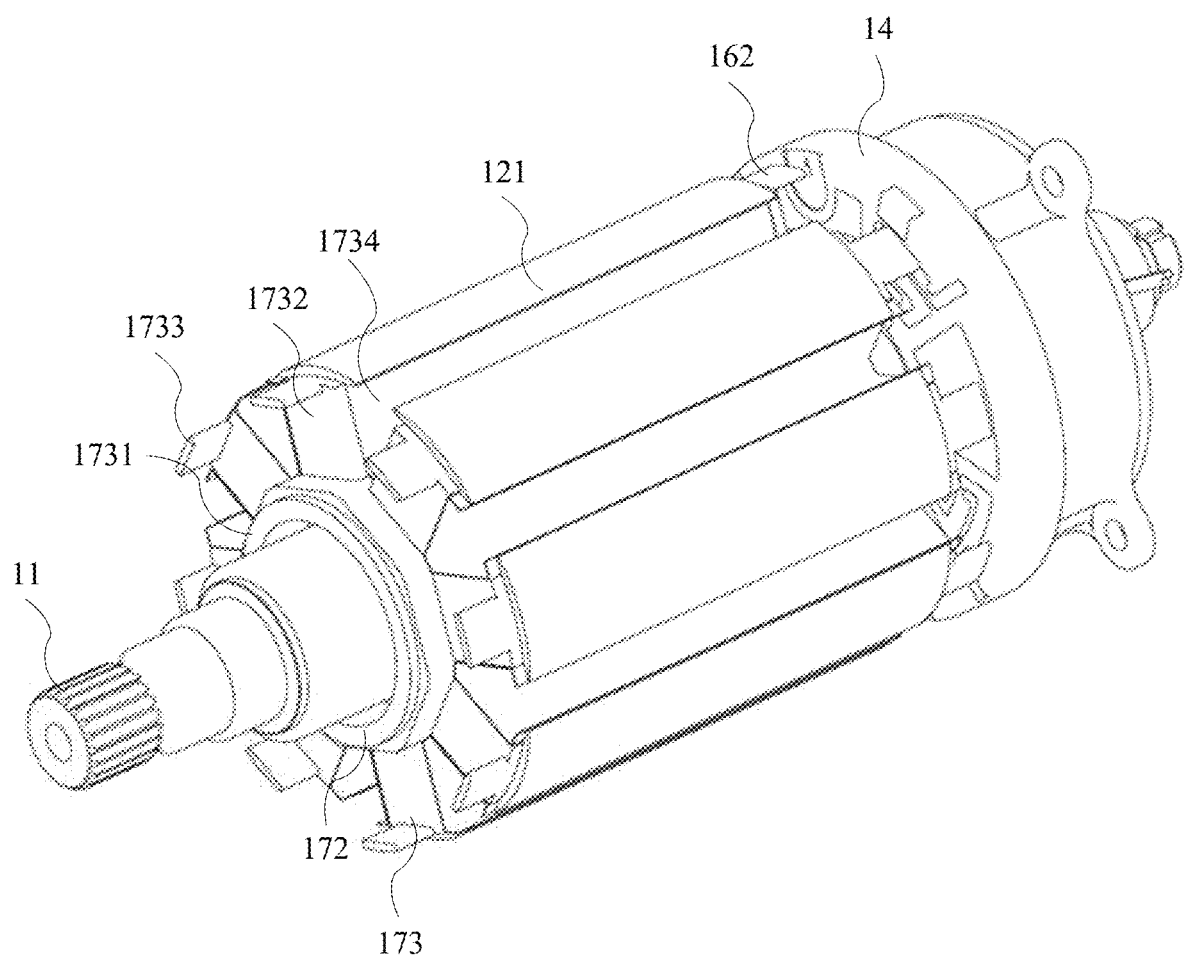
FIG. 15 is a schematic diagram of a partial structure of FIG. 11.

FIG. 15 is a schematic diagram of a partial structure of FIG. 11. Refer to FIG. 3, FIG. 9, and FIG. 15. The wound rotor 10 in this embodiment of this disclosure may further include a second end framework 173 sleeved on the second lantern ring 172, and the second end framework 173 is located between the second potting adhesive 171 and the rotor core 12. For example, the second end framework 173 is fastened to one end that is of the rotor core 12 and that faces the second potting adhesive 171, that is, fastened to the left end face of the rotor core 12.

An avoidance port 1734 is formed at a position that is of the second end framework 173 and that corresponds to the winding hole 128. Each rotor coil 13 passes through the avoidance port 1734, and is wound on one side that is of the second end framework 173 and that is away from the rotor core 12. In this way, when being an electrical-insulating material, the second end framework 173 can play a role of insulation between the rotor coil 13 and an end part of the rotor core 12.

It may be understood that a size of each avoidance port 1734 is the same as a size of the winding hole 128, so that when two adjacent rotor coils 13 pass through the avoidance port 1734, a gap can be reserved between the two adjacent rotor coils 13 for the coolant to flow. In some examples, a top part of the avoidance port 1734 may penetrate through an outer edge of the second end framework 173, to facilitate disposition of the avoidance port 1734.

For ease of disposition, the second end framework 173 may include a second annular connection part 1731 sleeved on the second lantern ring 172, and a plurality of second insulation parts 1732 extend at intervals from the second annular connection part 1731 in a direction away from the second lantern ring 172. The second insulation part 1732 and the second annular connection part 1731 further enhance stability of the rotor core 12 in the axial direction. The second insulation parts 1732 are spaced to form the avoidance port 1734, and each rotor coil 13 is wound on one side that is of the second insulation part 1732 and that is away from the rotor core 12, to enter an adjacent winding hole 128 from a left end of a winding hole 128.

The second annular connection part 1731 may be fixedly sleeved on the second lantern ring 172 by using a key groove, or may be integrated with the second lantern ring 172 as an integral part, to ensure that both the second end framework 173 and the second lantern ring 172 rotate synchronously with the rotating shaft 11.

During disposition, a part of the second potting adhesive 171 is filled in a gap of the second end framework 173. For example, when the second end framework 173 includes the second annular connection part 1731 and the second insulation part 1732, the part of the second potting adhesive 171 is filled between two ends that are of two adjacent second insulation parts 1732 and that are away from the rotating shaft 11, to enhance structural strength of the second end framework 173.

In this embodiment of this disclosure, the second end framework 173 is disposed on one end that is of the rotor core 12 and that is close to the second potting adhesive 171, that is, the left end face of the rotor core 12, to further enhance structural strength of the other end of the rotor core 12, and enhance the stability of the rotor core 12 in the axial direction of the rotating shaft 11.

Refer to FIG. 15. A second limiting part 1733 may extend, in a direction away from the rotor core 12, from one end that is of the second end framework 173 and that is away from the rotating shaft 11. For example, the second limiting part 1733 is disposed at one end that is of each second insulation part 1732 of the second end framework 173 and that is away from the second annular connection part 1731, and the second limiting part 1733 extends to one side away from the rotor core 12 in the axial direction. A part that is of each rotor coil 13 and that passes through the second end framework 173 is located between the second limiting part 1733 and the rotating shaft 11, to limit movement of the rotor coil 13 in a direction perpendicular to the rotating shaft 11, thereby improving stability of the rotor coil 13 in the radial direction.

During disposition, each part of the second end framework 173 may be an integral part formed integrally, so that the structural strength of the wound rotor 10 is enhanced, and an assembly process of the wound rotor 10 is simplified. Certainly, in another possible example, in the second end framework 173, the second limiting part 1733 and the second insulation part 1732 or the second insulation part 1732 and the second annular connection part 1731 can be connected in a clamping manner, a bonding manner, or the like. A disposition manner of the second end framework 173 is not limited herein.

Refer to FIG. 3 and FIG. 9. The first reinforcement assembly 16 in this embodiment of this disclosure may further include a first end framework 163 sleeved on the first lantern ring 162, and the first end framework 163 is located between the first potting adhesive 161 and the rotor core 12. For example, the first end framework 163 is fastened to one end that is of the rotor core 12 and that faces the first potting adhesive 161, that is, fastened to the right end face of the rotor core 12.

A structure of the first end framework 163 in this embodiment of this disclosure may be disposed the same as a structure of the second end framework 173. For example, an avoidance port (which is not shown in the figure) is formed at a position that is of the first end framework 163 and that corresponds to the winding hole 128. Each rotor coil 13 passes through the avoidance port, and is wound on one side that is of the first end framework 163 and that is away from the rotor core 12. In this way, when being an insulating material, the first end framework 163 can play a role of insulation between the rotor coil 13 and an end part of the rotor core 12.

It may be understood that a size of each avoidance port is the same as the size of the winding hole 128, so that when two adjacent rotor coils 13 pass through the avoidance port, a gap can be reserved between the two adjacent rotor coils 13 for the coolant to flow. In some examples, a top part of the avoidance port may penetrate through an outer edge of the first end framework 163, to facilitate disposition of the avoidance port.

Refer to FIG. 9. Similar to the structure of the second end framework 173, the first end framework 163 may include a first annular connection part 1631 sleeved on the first lantern ring 162, and a plurality of first insulation parts 1632 extend at intervals from the first annular connection part 1631 in a direction away from the first lantern ring 162. The first insulation parts 1632 and the first annular connection part 1631 further enhance the stability of the rotor core 12 in the axial direction. The first insulation parts 1632 are spaced to form the avoidance port, and each rotor coil 13 is wound on one side that is of the first insulation part 1632 and that is away from the rotor core 12, to enter an adjacent winding hole 128 from a right end of a winding hole 128.

The first annular connection part 1631 may be fixedly sleeved on the first lantern ring 162 by using a key groove, or may be integrated with the first lantern ring 162 as an integral part, to ensure that both the first end framework 163 and the first lantern ring 162 rotate synchronously with the rotating shaft 11.

During disposition, a part of the first potting adhesive 161 is filled in a gap of the first end framework 163. For example, when the first end framework 163 includes the first annular connection part 1631 and the first insulation part 1632, the part of the first potting adhesive 161 is filled between two ends that are of two adjacent first insulation parts 1632 and that are away from the rotating shaft 11, to enhance structural strength of the first end framework 163.

In this embodiment of this disclosure, the first end framework 163 is disposed on one end that is of the rotor core 12 and that is close to the first potting adhesive 161, that is, the right end face of the rotor core 12, to further enhance structural strength of one end of the rotor core 12, and enhance the stability of the rotor core 12 in the axial direction of the rotating shaft 11.

Refer to FIG. 8. A first limiting part 1633 may extend, in a direction away from the rotor core 12, from one end that is of the first end framework 163 and that is away from the rotating shaft 11. For example, the first limiting part 1633 is disposed at one end that is of each first insulation part 1632 of the first end framework 163 and that is away from the first annular connection part 1631, and the first limiting part 1633 extends to one side away from the rotor core 12 in the axial direction. A part that is of each rotor coil 13 and that passes through the first end framework 163 is located between the first limiting part 1633 and the rotating shaft 11, to limit the movement of the rotor coil 13 in the direction perpendicular to the rotating shaft 11, thereby improving the stability of the rotor coil 13 in the radial direction.

For a disposition manner of the first end framework 163, directly refer to the content of the second end framework 173. Details are not described herein again.

Refer to FIG. 2 and FIG. 3. In an optional example, the wound rotor 10 in this embodiment of this disclosure further includes a rotor jacket 18. The rotor jacket 18 may include a first annular jacket 181 and a second annular jacket 182. One of the first annular jacket 181 and the second annular jacket 182 is sleeved on a periphery that is of the first reinforcement assembly 16 and that is away from the rotating shaft 11, and the other of the first annular jacket 181 and the second annular jacket 182 is sleeved on a periphery that is of the second reinforcement assembly 17 and that is away from the rotating shaft 11, to further enhance the structural strength of the wound rotor 10 in this embodiment of this disclosure, and ensure structural stability of the wound rotor 10 in the high-speed rotation process.

For example, the first annular jacket 181 is sleeved on the first end framework 163 and a periphery that is of the first potting adhesive 161 and that is away from the rotating shaft 11, and the second annular jacket 182 is sleeved on the second end framework 173 and a periphery that is of the second potting adhesive 171 and that is away from the rotating shaft 11, to enhance structural strength of peripheries of the two reinforcement assemblies, namely, the first reinforcement assembly 16 and the second reinforcement assembly 17.

Figure 16:
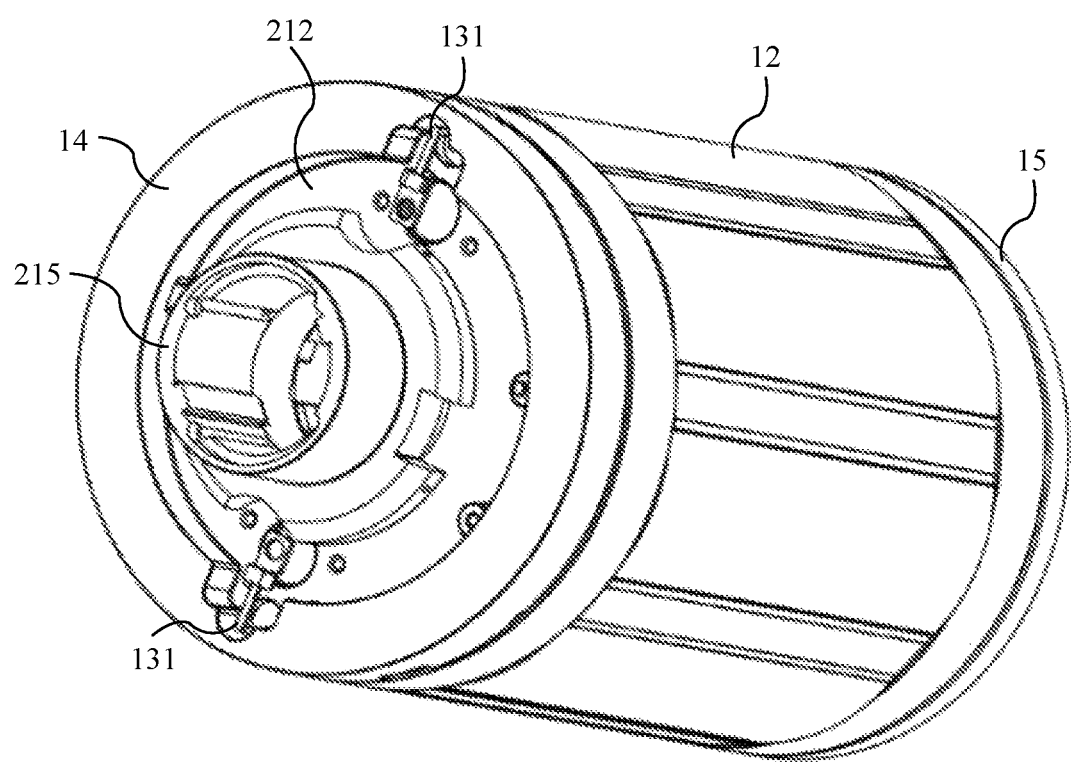
FIG. 16 is an assembly diagram of an excitation module rotor jacket and a wound rotor in FIG. 1.

FIG. 16 is an assembly diagram of an excitation module rotor jacket and the wound rotor in FIG. 1. Refer to FIG. 1, FIG. 2, FIG. 15, and FIG. 16. The motor rotor 100 in this embodiment of this disclosure may further include an excitation module 20. The excitation module 20 includes an excitation module rotor 21 and an excitation module stator 22. The excitation module rotor 21 is fastened to the rotating shaft 11. Refer to FIG. 9. Further, the excitation module rotor 21 includes an excitation transformer rotor 211 fixedly sleeved on the rotating shaft 11 and a rectifier board 212 electrically connected to the excitation transformer rotor 211. The rectifier board 212 is fastened to the first end plate 14, and the rotor coil 13 is electrically connected to the rectifier board 212. The rectifier board 212 may be a flexible circuit board integrated with a rectifier diode.

In an actual application, the excitation module stator 22 includes a wireless power transmit end (which is not shown in the figure). The wireless power transmit end may be disposed on a housing of the motor, and the excitation transformer rotor 211 of the excitation module 20 is a wireless power receive end. During operation, the wireless power transmit end transmits an alternating current of a power to the excitation transformer rotor 211 of the excitation module 20, the excitation transformer rotor 211 adjusts a voltage corresponding to the power to a voltage required by the motor rotor 100, and then the rectifier board 212 adjusts the alternating current into a direct current, and transmits the direct current to the rotor coil 13 of the motor rotor 100, to enable the rotor coil 13 to generate a magnetic field.

The wireless power transmit end and the excitation transformer rotor 211 may be disposed in the axial direction of the rotating shaft 11. For example, the wireless power transmit end of the excitation module stator 22 is located on one side that is of the excitation transformer rotor 211 and that is away from the rectifier board 212. In some examples, the wireless power transmit end and the excitation transformer rotor 211 may be alternatively disposed in the radial direction of the rotating shaft 11. For example, the wireless power transmit end is located on one side that is of the excitation transformer rotor 211 and that is away from the rotating shaft 11. It may be understood that there is a gap between the wireless power transmit end and the excitation transformer rotor 211, so that it is ensured that the excitation transformer rotor 211 does not affect structural stability of the wireless power transmit end in the high-speed rotation process with the rotating shaft 11.

In addition, the gap between the wireless power transmit end and the excitation transformer rotor 211 may be further used for heat dissipation.

Refer to FIG. 16. It should be noted that, in this embodiment of this disclosure, a terminal of the rotor coil 13 is disposed close to the first end plate 14, and the rectifier board 212 is fastened to the first end plate 14. In another example, the terminal of the rotor coil 13 may be alternatively disposed close to the second end plate 15, and the rectifier board 212 is fastened to the first end plate 14.

Still refer to FIG. 2 and FIG. 15. The excitation module 20 further includes a third potting adhesive 213. The excitation transformer rotor 211 is connected to the first end plate 14 by using the third potting adhesive 213. In this way, connection strength between the excitation transformer rotor 211 and the first end plate 14 is enhanced, thereby improving connection strength between the excitation module 20 and the wound rotor 10, and ensuring structural stability of the entire motor in a moving process.

In addition, the rectifier board 212 is fastened to the first end plate 14, so that the coolant in the heat dissipation groove 141 of the first end plate 14 can further dissipate heat from the rectifier board 212, thereby ensuring stable operation of the rectifier board 212.

In an actual application, the excitation transformer rotor 211 includes a transformer rotor core 2111 sleeved on the rotating shaft 11 and a transformer rotor coil 2112 wound on the transformer rotor core 2111. A wireless power transmit end on the stator 200 further provides an alternating current to the transformer rotor coil 2112. The third potting adhesive 213 is filled in a gap between the transformer rotor core 2111 and the first end plate 14, to enhance structural strength of the excitation module 20.

During disposition, the excitation transformer rotor 211 may be assembled on one side that is of the first end plate 14 and that is away from the rotor core 12, to reserve the second outlet channel 127 and a heat dissipation space on one side that is of the first end plate 14 and that faces the rotor core 12.

Refer to FIG. 9 and FIG. 16. The rectifier board 212 may be fastened to one side that is of the first end plate 14 and that is away from the rotor core 12, and the excitation transformer rotor 211 is disposed on one side that is of the rectifier board 212 and that is away from the first end plate 14, that is, the rectifier board 212 is located between the first end plate 14 and the excitation transformer rotor 211, and is located in the third potting adhesive 213. In this way, components of the excitation module 20 are packaged into an integral structure by using the third potting adhesive 213, so that the structural strength of the excitation module 20 is enhanced, and assembly between the excitation module 20 and both of the rotating shaft 11 and the wound rotor 10 is more convenient and faster.

In addition, the rectifier board 212 is disposed on the side that is of the first end plate 14 and that is away from the rotor core 12, to provide a proper disposition space for disposing the heat dissipation groove 141, and facilitate electrical connection between the rectifier board 212 and the excitation transformer rotor 211.

Figure 17:
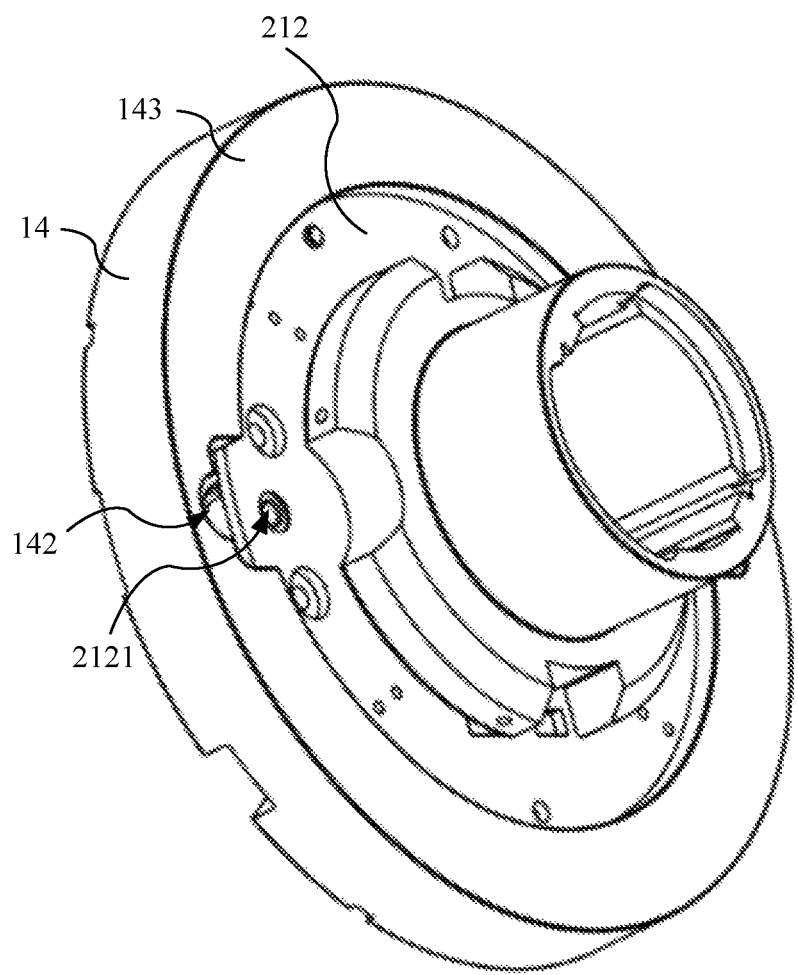
FIG. 17 is a schematic diagram of a partial structure of FIG. 16.

FIG. 17 is a schematic diagram of a partial structure of FIG. 16. Refer to FIG. 17. When the rectifier board 212 is further electrically connected to the rotor coil 13, the rectifier board 212 may be connected to the rotor coil 13 in a detachable manner.

For example, a connector may be disposed on one end of the rotor coil 13, and a pin (for example, a copper column) is disposed on one side of the rectifier board 212. The pin on the rectifier board 212 is inserted into the connector, so that the rectifier board 212 is electrically connected to the rotor coil 13. When the rectifier board 212 is disposed on one side that is of the first end plate 14 and that is away from the rotor core 12, the pin disposed on the rectifier board 212 may pass through the first end plate 14, and be in electrical contact with the connector on the rotor coil 13.

In some examples, a lead 131 may be further disposed at one end of the rotor coil 13, and a terminal 132 is disposed at one end of the lead 131. In addition, a bolt hole may be provided on the rectifier board 212, and the terminal 132 may be fastened to the rectifier board 212 by using a bolt that is disposed in the bolt hole 2121, to enhance electrical connection stability between the terminal 132 and the rectifier board 212. It may be understood that when the rectifier board 212 is located on the side that is of the first end plate 14 and that is away from the rotor core 12, a mounting hole 142 may be provided on the first end plate 14. The lead 131 and the terminal 132 first pass through the mounting hole 142, and are electrically connected to the rectifier board 212 by using the bolt.

The rectifier board 212 is connected to the rotor coil 13 in a bolt or pin manner. In this way, the excitation module 20 may be used as a separate component, so that disassembly and replacement between the excitation module 20 and the wound rotor 10 are more convenient and faster.

In another example, the lead 131 of the rotor coil 13 may be alternatively directly welded on the rectifier board 212, to simplify a connection structure between the rotor coil 13 and the rectifier board 212, thereby improving assembly efficiency of the entire motor.

In some other examples, the rectifier board 212 may be alternatively fastened to the side that is of the first end plate 14 and that faces the rotor core 12, and the lead 131 of the rotor coil 13 may be directly fastened to the rectifier board 212 by using the bolt or the like. The lead 131 on the excitation transformer rotor 211 located on the side that is of the first end plate 14 and that is away from the rotor core 12 may pass through the mounting hole 142 on the first end plate 14, and be electrically connected to the rectifier board 212.

Refer to FIG. 14. In an actual application, for a reason, for example, an assembling error of each component of the motor rotor, a case in which the motor rotor 100 moves away from an axis of the rotating shaft 11 in the high-speed rotation process is prone to occur, which affects stability and drive efficiency of the entire motor. Based on this, in this embodiment of this disclosure, a notch (which is not shown in the figure) may be formed on any side of the first end plate 14 or the second end plate 15, and the notch is disposed at a position that is of the first end plate 14 or the second end plate 15 and that is away from the rotating shaft 11. A center of gravity of the wound rotor 10 is adjusted by using the notch, to implement a dynamic balance of the entire motor rotor 100, and ensure that the motor rotor 100 can stably move around the axis of the rotating shaft 11.

For example, when the rotor core 12, the first reinforcement assembly 16, and the like that are sleeved on the rotating shaft 11 are tilted downward to the rotating shaft 11 in the high-speed rotation process, the notch may be disposed on the first end plate 14 or the second end plate 15 below the rotating shaft, to shift the center of gravity of the wound rotor 10 upward, and ensure that the rotor core 12, the first reinforcement assembly 16, and the like stably rotate around the axis of the rotating shaft 11.

Refer to FIG. 17. To meet a requirement for a notch of a different depth, in this embodiment of this disclosure, an annular boss 143 may be formed on a part of a sidewall that is of the first end plate 14 and that is away from the rotating shaft 11. For example, the annular boss 143 may be disposed on the side that is of the first end plate 14 and that is away from the rotor core 12, and the annular boss 143 is disposed at a part of an outer edge that is of the first end plate 4 and that is away from the rotating shaft 11 in the circumferential direction. According to this disposition, a thickness of the part of the outer edge that is of the first end plate 14 and that is away from the rotating shaft 11 can be increased. In this way, the notch is disposed on the annular boss 143, so that a depth range of the notch can be increased, and a center of gravity adjustment range of the motor rotor 100 can be improved. A thickness of the annular boss may be adjusted based on an actual requirement. This is not limited herein.

It may be understood that the annular boss (which is not shown in the figure) may be alternatively formed on a part of a sidewall that is of the second end plate 15 and that is away from the rotating shaft 11, and the notch configured to perform center of gravity adjustment is disposed on the annular boss, to increase the depth range of the notch, and improve the center of gravity adjustment range of the motor rotor 100.

When the annular boss 143 on the first end plate 14 may be disposed on one side that is of the first end plate 14 and that has the rectifier board 212, and the rectifier board 212 is located between the rotating shaft 11 and the annular boss 143, the annular boss 143 can limit the rectifier board 212 in the radial direction, to enhance structural stability of the rectifier board 212 on the first end plate 14, protect the rectifier board 212, and avoid scraping damage caused by an external component to the rectifier board 212.

Refer to FIG. 15 and FIG. 16. The excitation module 20 may further include an excitation module rotor jacket 215 sleeved on the rotating shaft 11, and the excitation transformer rotor 211 is sleeved on the excitation module rotor jacket 215. For example, the transformer rotor core 2111 is sleeved on the excitation module rotor jacket 215, to enhance connection strength between the excitation transformer rotor 211 and the rotating shaft 11, thereby ensuring stability of the excitation transformer rotor 211 in the high-speed rotation process of the rotating shaft 11.

In this embodiment of this disclosure, one end of the third potting adhesive 213 is connected to the excitation module rotor jacket 215, to further ensure that the components of the excitation module 20 form the integral structure after being packaged by using the third potting adhesive 213, so that connection strength between the components of the entire excitation module 20 is enhanced, and the integrally modularized excitation module 20 is quickly assembled on the rotating shaft 11 and is fixedly connected to the wound rotor 10.

To implement effective heat dissipation for the excitation module 20, a third heat dissipation channel (which is not shown in the figure) that is connected to the first shaft hole 111 may be formed on the first end plate 14 or the excitation module rotor jacket 215 in the axial direction of the rotating shaft 11. In this way, the coolant flowing out from the first shaft hole 111 can further enter the third heat dissipation channel, to effectively dissipate heat from the excitation module 20.

For example, a heat dissipation through hole is provided on the first end plate 14 and an inner side that is of the excitation module rotor jacket 215 and that is close to the rotating shaft 11. The heat dissipation through hole is used as the third heat dissipation channel, one end of the heat dissipation through hole penetrates to the drainage groove 1621 on the first lantern ring 162, and the other end of the heat dissipation through hole penetrates to one end that is of the excitation module rotor jacket 215 and that is away from the first end plate 14. In this way, a part of the coolant flowing out from the first shaft hole 111 enters the third heat dissipation channel through the drainage groove 1621, exchanges heat with the first end plate 14 and the excitation module rotor jacket 215, and flows out from the end that is of the excitation module rotor jacket 215 and that is away from the first end plate 14 into a gap between the motor rotor 100 and the stator 200.

Further, a third outlet channel (which is not shown in the figure) may be further formed between one side that is of the first end plate 14 and that faces the excitation transformer rotor 211 and the third potting adhesive 213. One end of the third outlet channel is connected to the third heat dissipation channel on the first end plate 14, and the other end of the third outlet channel is connected to an outer edge that is of the first end plate 14 and that is away from the rotating shaft 11. In this way, the coolant in the third heat dissipation channel can further enter the third outlet channel, to effectively dissipate heat from the side that is of the first end plate 14 and that faces the excitation transformer rotor 211, the rectifier board 212, and the third potting adhesive 213.

In addition, refer to FIG. 2 and FIG. 9. To improve stability of the excitation transformer rotor 211 in the axial direction, a third lantern ring 214 may be disposed on one side that is of the excitation transformer rotor 211 and that is away from the first end plate 14, and the third lantern ring 214 is fixedly sleeved on the rotating shaft 11 to block the excitation transformer rotor 211, thereby further ensuring stability of the excitation module 20 on the rotating shaft 11.

It should be noted that all of the first potting adhesive 161, the second potting adhesive 171, the third potting adhesive 213, and a fourth potting adhesive 19 in this embodiment of this disclosure may be replaced with a plastic packaging adhesive, provided that the structural strength of the entire motor rotor 100 can be ensured. For example, refer to FIG. 9 and FIG. 10. The plastic packaging adhesive is filled in a gap between the first end plate 14 and the rotor core 12, to enhance connection strength between the rotor core 12 and the first end plate 14, thereby improving mechanical strength of the entire wound rotor 10.

Figure 18:
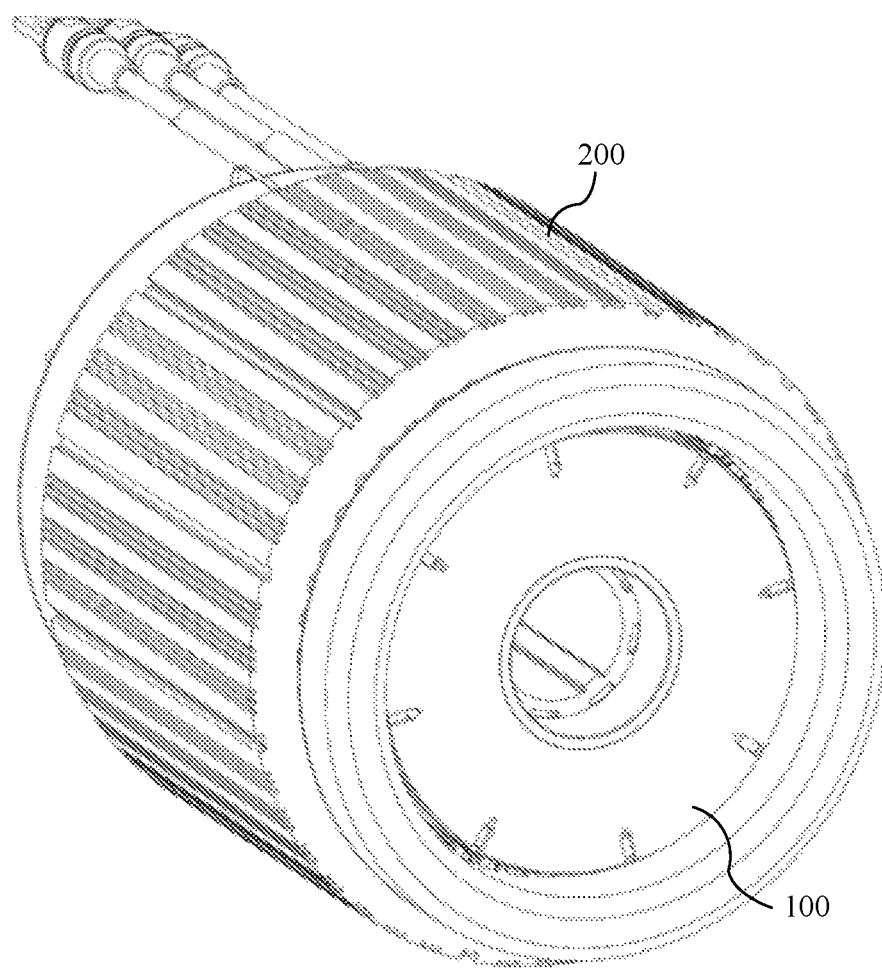
FIG. 18 is a schematic diagram of a partial structure of a motor according to an embodiment of this disclosure.

FIG. 18 is a schematic diagram of a partial structure of a motor according to an embodiment of this disclosure. Refer to FIG. 18. An embodiment of this disclosure further provides a motor. The motor includes a stator 200 and the foregoing motor rotor 100, where the stator 200 is movably sleeved on the periphery of the motor rotor 100. In an actual application, both the stator 200 and the motor rotor 100 are located in a housing of the motor, where the stator 200 is fastened to an inner wall of the housing, and the motor rotor 100 is movably connected to the inner wall of the housing by using a bearing.

During operation, the excitation module rotor 21 of the excitation module 20 provides a direct current to the rotor coil 13 of the motor rotor 100, so that the wound rotor 10 generates a stationary magnetic field with constant polarity, and then rotates under the action of a rotating magnetic field of the stator 200, to drive a load, for example, a wheel, to rotate.

Coolant flowing out from the first outlet channel 125 and the second outlet channel 127 of the motor rotor 100 may flow in a gap between the stator 200 and the motor rotor 100, thereby implementing heat dissipation on the stator 200.

In the motor in this embodiment of this disclosure, the motor rotor 100 is disposed in the stator 200. Compared with air cooling heat dissipation in the conventional technology, heat dissipation efficiency of the motor rotor 100 is effectively improved, a useful life of the motor is prolonged, and stable operation of the motor is ensured. In addition, compared with a conventional motor, an additional heat dissipation fan does not need to be disposed in a heat dissipation structure of the motor in this embodiment of this disclosure, and the winding hole 128 in the rotor core 12 is directly used as the first heat dissipation channel 123, so that a heat dissipation effect on the motor is improved, a size of the motor is reduced, and a structure of the motor is simplified, thereby improving assembly efficiency of the motor.

An embodiment of this disclosure further provides a vehicle, including at least wheels, a transmission component, and the foregoing motor. The rotating shaft 11 of the motor is connected to the wheels by using the transmission component.

The vehicle provided in this embodiment may be an electric vehicle (EV), a pure electric vehicle/battery electric vehicle (PEV/BEV), a hybrid electric vehicle (HEV), a range extended electric vehicle (REEV), a plug-in hybrid electric vehicle (PHEV), a new energy vehicle (New Energy Vehicle), or the like.

The rotating shaft 11 of the motor is connected to the wheels by using the transmission component. In this way, the rotating shaft 11 of the motor rotates to output power, and the transmission component transmits the power to the wheels, so that the wheels rotate. In this embodiment, it should be noted that a quantity of motors included in the vehicle may be one or two. When the quantity of motors is one, the motor is connected to two front wheels or two rear wheels by using the transmission component. When the motor is connected to the two front wheels by using the transmission component, the front wheels are driving wheels, and the rear wheels are driven wheels. Correspondingly, when the motor is connected to the two rear wheels by using the transmission component, the rear wheels are driving wheels, and the front wheels are driven wheels. When the quantity of motors is two, one of the motors is connected to the two front wheels by using the transmission component, and the other motor is connected to the two rear wheels by using another transmission component.

In the vehicle provided in this embodiment of this disclosure, the motor is used to drive the wheels to rotate. A heat dissipation effect of the motor is good, so that the motor can stably drive the wheels to rotate without affecting normal drive of the wheels due to overheating of the motor, thereby effectively improving drive efficiency of the vehicle, and reducing drive and heat dissipation energy consumption of the vehicle.

In the descriptions of embodiments of this disclosure, it should be noted that, unless otherwise clearly specified and limited, terms "assemble", "connected", and "connection" should be understood in a broad sense. For example, the terms may be used for a fixed connection, an indirect connection through an intermediate medium, an internal connection between two elements, or an interaction relationship between two elements. Persons of ordinary skill in the art may understand specific meanings of the terms in embodiments of this disclosure based on specific cases.

In the specification, claims, and accompanying drawings of embodiments of this disclosure, the terms "first", "second", "third", "fourth", and so on (if existent) are intended to distinguish between similar objects but do not necessarily indicate a specific order or sequence.

What is claimed is:

1. A motor rotor, comprising:
   a wound rotor comprising:
   a rotating shaft;
   a first shaft hole formed on the rotating shaft;
   a rotor core fixedly sleeved on the rotating shaft;
   a plurality of rotor coils;
   winding holes surrounding the rotating shaft and provided at intervals on the rotor core, wherein each winding hole penetrates through two ends that are of the rotor core and that are disposed in an axial direction, wherein each rotor coil is wound on hole walls of two adjacent winding holes, and wherein two adjacent rotor coils share one winding hole;
   a first heat dissipation channel coupled to the first shaft hole, wherein the first heat dissipation channel comprises a gap formed between two adjacent rotor coils;
   a plurality of first heat dissipation channels, wherein the first heat dissipation channel is one of the plurality of first heat dissipation channels;
   a plurality of first shaft holes provided at intervals on the rotating shaft in a circumferential direction, wherein a quantity of the plurality of first shaft holes is equal to or less than a quantity of the plurality of first heat dissipation channels;
   a first end plate and a second end plate that are respectively disposed at the two ends that are of the rotor core and that are in the axial direction;
   a first radial channel formed between the rotor core and the first end plate and configured to couple the first shaft hole and the first heat dissipation channel;
   a first outlet channel formed between the second end plate and the rotor core and coupled to an outside of the rotor core, and wherein the first heat dissipation channel is coupled to the first outlet channel; and
   a first reinforcement assembly disposed between the first end plate and the rotor core, and wherein the first radial channel is disposed between the first reinforcement assembly and the first end plate.

2. The motor rotor of claim 1, wherein the first reinforcement assembly comprises:
   a first potting adhesive; and
   first radial holes surrounding the rotating shaft and provided at intervals on the first potting adhesive,
   wherein a first radial hole of the plurality of the first radial holes separately extends to the first heat dissipation channel and the first end plate in the axial direction, and
   wherein the first radial channel comprises at least a part that is of the first radial hole and that extends in a radial direction.

3. The motor rotor of claim 2, wherein a quantity of the first radial holes is equal to the quantity of the plurality of first shaft holes, and wherein each of the first radial holes penetrates to a corresponding first shaft hole in the radial direction.

4. The motor rotor of claim 2, wherein the first reinforcement assembly further comprises a first lantern ring fixedly sleeved on the rotating shaft, wherein the first potting adhesive is disposed on a periphery of the first lantern ring, wherein the first radial channel further comprises drainage grooves that surround the rotating shaft and that are disposed at intervals on the first lantern ring, wherein the drainage grooves are disposed corresponding to the plurality of first shaft holes, wherein a first end of each drainage groove extends to a corresponding first shaft hole, and wherein a second end of the drainage groove is coupled to the first radial hole.

5. The motor rotor of claim 4, wherein the quantity of the plurality of first shaft holes is less than of the quantity of the first radial holes, and wherein one drainage groove is coupled between two adjacent first radial holes.

6. The motor rotor of claim 5, further comprising a gap formed between the first lantern ring and a part that is of the first potting adhesive and that faces each of the drainage grooves, wherein two ends of each gap respectively extend to the first radial holes on two adjacent sides of the drainage groove.

7. The motor rotor of claim 4, wherein the first reinforcement assembly further comprises a first end framework sleeved on the first lantern ring and located between the first potting adhesive and the rotor core, wherein a first avoidance port is formed at a position that is of the first end framework and that corresponds to the winding hole, and wherein each rotor coil passes through the first avoidance port and is wound on one side that is of the first end framework and that is away from the rotor core.

8. The motor rotor of claim 7, wherein a first limiting part extends, in a direction away from the rotor core, from one end that is of the first end framework and that is away from the rotating shaft, and wherein a part that is of each rotor coil and that passes through the first end framework is located between the first limiting part and the rotating shaft.

9. The motor rotor of claim 4, wherein the wound rotor further comprises a second reinforcement assembly disposed between the second end plate and the rotor core, and wherein the first outlet channel is disposed between the second reinforcement assembly and the second end plate.

10. The motor rotor of claim 9, wherein the second reinforcement assembly comprises a second potting adhesive, wherein second radial holes surrounding the rotating shaft are provided at intervals on the second potting adhesive, wherein two ends that are of the second radial hole and that are in the axial direction respectively extend to the first heat dissipation channel and the second end plate, and wherein at least a part that is of the second radial hole and that extends in the radial direction is configured as the first outlet channel.

11. The motor rotor of claim 10, further comprising a plurality of second heat dissipation channels surrounding the rotating shaft and that are disposed at intervals on the rotor core, wherein a second heat dissipation channel of the plurality of second heat dissipation channels is located between the rotating shaft and the first heat dissipation channel, wherein the second heat dissipation channel penetrates through the two ends that are of the rotor core and that are disposed in the axial direction, wherein a second shaft hole coupled to the second heat dissipation channel is formed on the rotating shaft, and wherein the second heat dissipation channel is used for inflow of coolant proximate to the rotating shaft.

12. The motor rotor of claim 11, wherein the second reinforcement assembly further comprises a second lantern ring fixedly sleeved on the rotating shaft and disposed between the rotating shaft and the second potting adhesive, wherein a first annular groove is formed between the second lantern ring and the rotating shaft, and wherein the second shaft hole and one end that is of the second heat dissipation channel and that faces the second lantern ring are located in the first annular groove.

13. The motor rotor of claim 12, further comprising:
a second outlet channel coupled to the outside of the rotor core and formed between the first potting adhesive and the first end plate; and
a perforative hole formed on the first lantern ring in an extension direction of the rotating shaft, wherein two ends of the perforative hole are respectively coupled to the second heat dissipation channel and the second outlet channel.

14. A motor comprising:
a stator; and
a motor rotor comprising a wound rotor, wherein the wound rotor comprises:
a rotating shaft;
a rotor core fixedly sleeved on the rotating shaft;
a plurality of rotor coils;
a plurality of winding holes surrounding the rotating shaft and provided at intervals on the rotor core, wherein each winding hole penetrates through two ends that are of the rotor core and that are disposed in an axial direction, wherein each rotor coil is wound on hole walls of two adjacent winding holes, and wherein two adjacent rotor coils share one winding hole;
a first shaft hole formed on the rotating shaft;
a first heat dissipation channel coupled to the first shaft hole, wherein the first heat dissipation channel comprises a gap formed between two adjacent rotor coils;
a plurality of first heat dissipation channels, wherein the first heat dissipation channel is one of the plurality of first heat dissipation channels;
a plurality of first shaft holes provided at intervals on the rotating shaft in a circumferential direction, wherein a quantity of the plurality of first shaft holes is equal to or less than a quantity of the plurality of first heat dissipation channels;
a first end plate and a second end plate that are respectively disposed at the two ends that are of the rotor core and that are in the axial direction;
a first radial channel formed between the rotor core and the first end plate and configured to couple the first shaft hole and the first heat dissipation channel;
a first outlet channel formed between the second end plate and the rotor core and coupled to an outside of the rotor core, and wherein the first heat dissipation channel is coupled to the first outlet channel; and
a first reinforcement assembly disposed between the first end plate and the rotor core, and wherein the first radial channel is disposed between the first reinforcement assembly and the first end plate,
wherein the stator is sleeved on a periphery of the motor rotor, and wherein the motor rotor is movable relative to the stator.

15. A vehicle comprising:
at least two wheels;
a transmission component; and
a motor comprising:
a stator; and
a motor rotor comprising a wound rotor, wherein the wound rotor comprises:
a rotating shaft;
a rotor core fixedly sleeved on the rotating shaft;
a plurality of rotor coils;
a plurality of winding holes surrounding the rotating shaft and provided at intervals on the rotor core, wherein each winding hole penetrates through two ends that are of the rotor core and that are disposed in an axial direction, wherein each rotor coil is wound on hole walls of two adjacent winding holes, and wherein two adjacent rotor coils share one winding hole;
a first shaft hole formed on the rotating shaft; and
a first heat dissipation channel coupled to the first shaft hole, wherein the first heat dissipation channel comprises a gap formed between two adjacent rotor coils,
wherein the stator is movably-sleeved on a periphery of the motor rotor, wherein the motor rotor is movable relative to the stator, and
wherein the rotating shaft is coupled to the wheels using the transmission component.

16. The vehicle of claim 15, wherein the wound rotor further comprises:
a plurality of first heat dissipation channels, wherein the first heat dissipation channel is one of the plurality of first heat dissipation channels; and
a plurality of first shaft holes provided at intervals on the rotating shaft in a circumferential direction, wherein a quantity of the plurality of first shaft holes is equal to or less than a quantity of the plurality of first heat dissipation channels.

17. The vehicle of claim 16, wherein the wound rotor further comprises:
a first end plate and a second end plate that are respectively disposed at the two ends that are of the rotor core and that are in the axial direction;
a first radial channel formed between the rotor core and the first end plate and configured to couple the first shaft hole and the first heat dissipation channel; and
a first outlet channel formed between the second end plate and the rotor core and coupled to an outside of the rotor core, and wherein the first heat dissipation channel is coupled to the first outlet channel.

18. The vehicle of claim 17, wherein the wound rotor further comprises a first reinforcement assembly disposed between the first end plate and the rotor core, and wherein the first radial channel is disposed between the first reinforcement assembly and the first end plate.

19. The vehicle of claim 18, wherein the first reinforcement assembly comprises:
- a first potting adhesive; and
- first radial holes surrounding the rotating shaft and provided at intervals on the first potting adhesive,
- wherein a first radial hole of the plurality of the first radial holes separately extends to the first heat dissipation channel and the first end plate in the axial direction, and
- wherein the first radial channel comprises at least a part that is of the first radial hole and that extends in a radial direction.

20. The vehicle of claim 19, wherein a quantity of the first radial holes is equal to the quantity of the plurality of first shaft holes, and wherein each of the first radial holes penetrates to a corresponding first shaft hole in the radial direction.

* * * * *

UNITED STATES PATENT AND TRADEMARK OFFICE
CERTIFICATE OF CORRECTION

| | | |
|---|---|---|
| PATENT NO. | : 12,413,116 B2 | Page 1 of 1 |
| APPLICATION NO. | : 17/990113 | |
| DATED | : September 9, 2025 | |
| INVENTOR(S) | : Jinhua Chen et al. | |

It is certified that error appears in the above-identified patent and that said Letters Patent is hereby corrected as shown below:

In the Claims

Claim 15, Column 34, Line 36: "wherein the stator is movably-sleeved" should read "wherein the stator is sleeved"

Signed and Sealed this
Twenty-eighth Day of October, 2025

John A. Squires
*Director of the United States Patent and Trademark Office*